United States Patent
Kim et al.

(10) Patent No.: US 10,631,334 B2
(45) Date of Patent: Apr. 21, 2020

(54) METHOD FOR MANAGING NAV IN WIRELESS LAN SYSTEM, AND DEVICE FOR SAME

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR); Jinmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 63 days.

(21) Appl. No.: 15/578,420

(22) PCT Filed: Jun. 9, 2016

(86) PCT No.: PCT/KR2016/006133
§ 371 (c)(1),
(2) Date: Nov. 30, 2017

(87) PCT Pub. No.: WO2016/200182
PCT Pub. Date: Dec. 15, 2016

(65) Prior Publication Data
US 2018/0213558 A1    Jul. 26, 2018

Related U.S. Application Data

(60) Provisional application No. 62/173,375, filed on Jun. 10, 2015, provisional application No. 62/181,216, (Continued)

(51) Int. Cl.
*H04W 74/08* (2009.01)
*H04W 74/00* (2009.01)
*H04W 84/12* (2009.01)

(52) U.S. Cl.
CPC ......... *H04W 74/08* (2013.01); *H04W 74/006* (2013.01); *H04W 84/12* (2013.01)

(58) Field of Classification Search
CPC ........................... H04W 74/08; H04W 74/006
(Continued)

(56) References Cited

U.S. PATENT DOCUMENTS

2007/0147284 A1* 6/2007 Sammour ............. H04J 3/0605
                                                        370/328
2009/0109938 A1* 4/2009 Singh ................ H04W 74/0816
                                                        370/337
(Continued)

FOREIGN PATENT DOCUMENTS

KR    1020150007252 A    1/2015
WO       2013191439 A1   12/2013

OTHER PUBLICATIONS

R. Gunasekaran, et al., "Throughput Enhancement in Ad hoc Networks Using Virtual Carrier Sensing Mechanism", 2010 International Conference on Electronics and Information Engineering (ICEIE 2010), vol. 1, pp. 105-109, Aug. 1, 2010.

*Primary Examiner* — Peter G Solinsky
(74) *Attorney, Agent, or Firm* — Dentons US LLP

(57) ABSTRACT

A method for managing a NAV (network allocation vector) by a station (STA) in a wireless communication LAN system according to an embodiment of the present invention comprises the steps of: receiving a frame including duration information; and changing a NAV timer of the STA on the basis of the duration information of the frame. When an event occurs for a reset of the NAV timer, the STA may determine whether to reset the NAV timer in consideration of the remaining time that existed in the NAV timer right before the NAV timer was changed.

13 Claims, 30 Drawing Sheets

Related U.S. Application Data filed on Jun. 18, 2015, provisional application No. 62/187,267, filed on Jul. 1, 2015, provisional application No. 62/189,760, filed on Jul. 8, 2015.

(58) Field of Classification Search
USPC .......................................................... 370/329
See application file for complete search history.

(56) References Cited

U.S. PATENT DOCUMENTS

| | | | | |
|---|---|---|---|---|
| 2012/0327870 A1* | 12/2012 | Grandhi | ............... | H04W 28/06 370/329 |
| 2014/0010145 A1 | 1/2014 | Liu et al. | | |
| 2014/0112266 A1* | 4/2014 | Seok | .................... | H04W 74/04 370/329 |
| 2015/0049680 A1* | 2/2015 | Jeffery | .............. | H04W 74/0816 370/329 |
| 2015/0063258 A1* | 3/2015 | Merlin | .................... | H04L 47/12 370/329 |
| 2015/0195079 A1* | 7/2015 | Gong | .................... | H04L 5/1415 370/277 |
| 2015/0249936 A1* | 9/2015 | Chen | ................... | H04W 28/065 370/329 |
| 2015/0264699 A1* | 9/2015 | Fwu | ........................ | H04L 5/003 370/329 |
| 2016/0088555 A1* | 3/2016 | Trainin | ............. | H04W 74/0816 370/311 |
| 2016/0174270 A1* | 6/2016 | Jeong | ................... | H04W 48/08 370/315 |
| 2016/0261327 A1* | 9/2016 | Merlin | ............. | H04W 72/0413 |
| 2016/0338106 A1* | 11/2016 | Liu | .................... | H04W 74/0816 |
| 2016/0345295 A1* | 11/2016 | Yang | ..................... | H04W 8/005 |
| 2018/0063775 A1* | 3/2018 | Morioka | ................ | H04W 48/16 |

* cited by examiner

METHOD FOR MANAGING NAV IN WIRELESS LAN SYSTEM, AND DEVICE FOR SAME

This application is a 35 USC § 371 National Stage entry of International Application No. PCT/KR2016/006133 filed on Jun. 9, 2016, and claims priority to U.S. Provisional Application Nos. 62/173,375 filed Jun. 10, 2015; 62/181,216 filed Jun. 18, 2015; 62/187,267 filed Jul. 1, 2015 and 62/189,760 filed Jul. 8, 2015, all of which are hereby incorporated by reference in their entireties as if fully set forth herein.

TECHNICAL FIELD

The present invention relates to a method and apparatus for managing a Network Allocation Vector (NAV) in a wireless local area network (WLAN) system, and more particularly to a method and apparatus for setting, updating, or resetting a Network Allocation Vector (NAV).

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

An object of the present invention is to provide a method and apparatus for performing NAV (Network Allocation Vector) reset in consideration of a residual time that was present in a NAV timer immediately before the NAV timer is changed to another in a WLAN system.

The present invention is not limited to the above technical problems and other technical objects may be inferred from embodiments of the present invention.

Technical Solution

The object of the present invention can be achieved by providing a method for managing a network allocation vector (NAV) by a station (STA) in a wireless local area network (WLAN) system, the method including: receiving a frame including duration information; and changing a NAV timer of the STA based on the duration information of the frame, wherein when an event for resetting the NAV timer occurs, the STA determines whether to reset the NAV timer in consideration of a residual time that was present in the NAV timer immediately before the NAV timer is changed.

In accordance with another aspect of the present invention, a station (STA) for managing a network allocation vector (NAV) in a wireless local area network (WLAN) system includes: a receiver to receive a frame including duration information; and a processor to change a NAV timer of the STA based on the duration information of the frame, wherein when an event for resetting the NAV timer occurs, the processor determines whether to reset the NAV timer in consideration of a residual time that was present in the NAV timer immediately before the NAV timer is changed.

In changing the NAV timer, the STA may store a NAV update indicator which indicates whether the change of the NAV timer is an initial setting from a zero value or is an update from a non-zero value. When the stored NAV update indicator indicates that the change of the NAV timer is the initial setting from the zero value, the STA may reset the NAV timer. When the stored NAV update indicator indicates that the change of the NAV timer is the update from the non-zero value, the may STA maintain the NAV timer without resetting the NAV timer.

In changing the NAV timer, the STA may store a NAV difference value indicating a difference between a NAV timer value changed based on the duration information and the residual time that was present in the NAV timer immediately before the NAV timer is changed. When the event for resetting the NAV timer occurs, the STA may restore, using the stored NAV difference value, a time that would be present in the NAV timer at a current time if the NAV timer were not changed by the frame.

In changing the NAV timer, the STA may additionally store and manage a previous NAV timer immediately before the NAV timer is changed. When the event for resetting the NAV timer occurs, the STA may determine whether the previous NAV timer is valid, and may change the NAV timer of a current time to the previous NAV timer without resetting the NAV timer if the previous NAV timer is valid. In determining whether the previous NAV timer is valid, the STA may determine the previous NAV timer is valid when the previous NAV timer is higher than zero, and the STA may determine the previous NAV timer is invalid when the previous NAV timer is set to zero.

The frame may be Request-to-Send (RTS) or Multi User-RTS (MU-RTS) and the event for resetting the NAV timer may include no reception of another frame within a predetermined time from a reception time of the frame.

The frame may be a trigger frame and the event for resetting the NAV timer may include a reception of a Content Free (CF)-END frame.

Advantageous Effects

As is apparent from the above description, according to the embodiment of the present invention, since the STA performs NAV reset in consideration of the residual time that was present in the NAV timer immediately before the NAV timer is changed, the TXOP holder/responder of the corresponding residual time can be protected even though an event for the NAV reset occurs.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
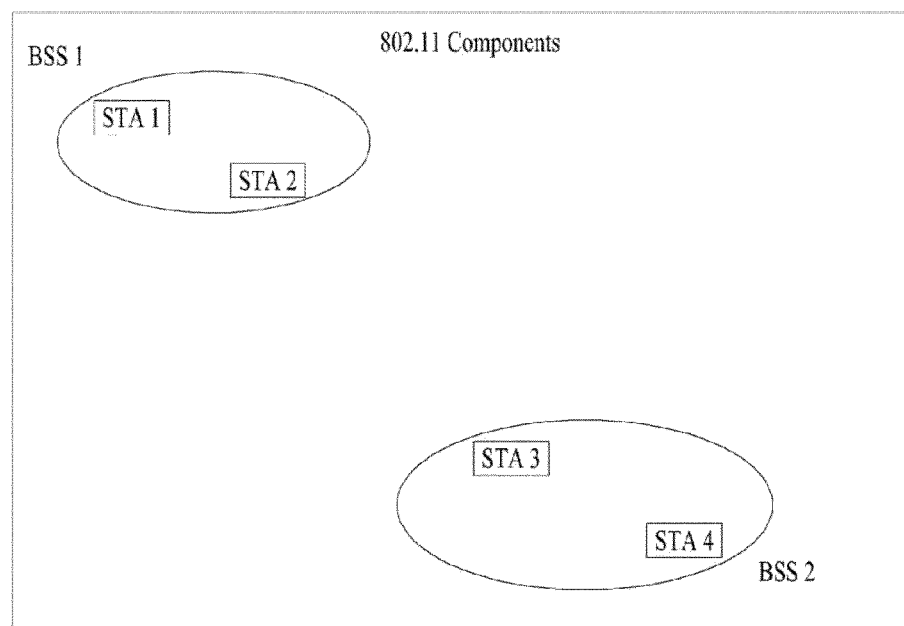
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
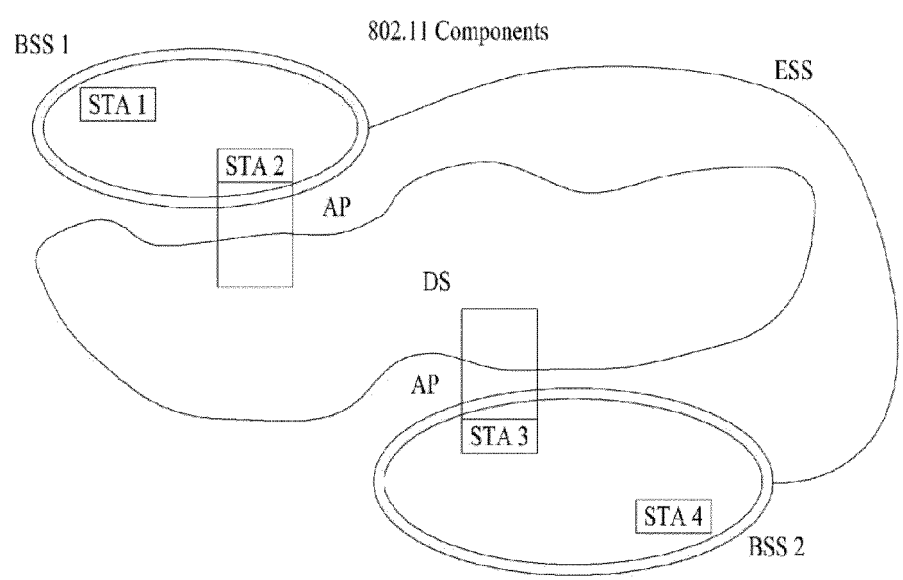
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of a STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
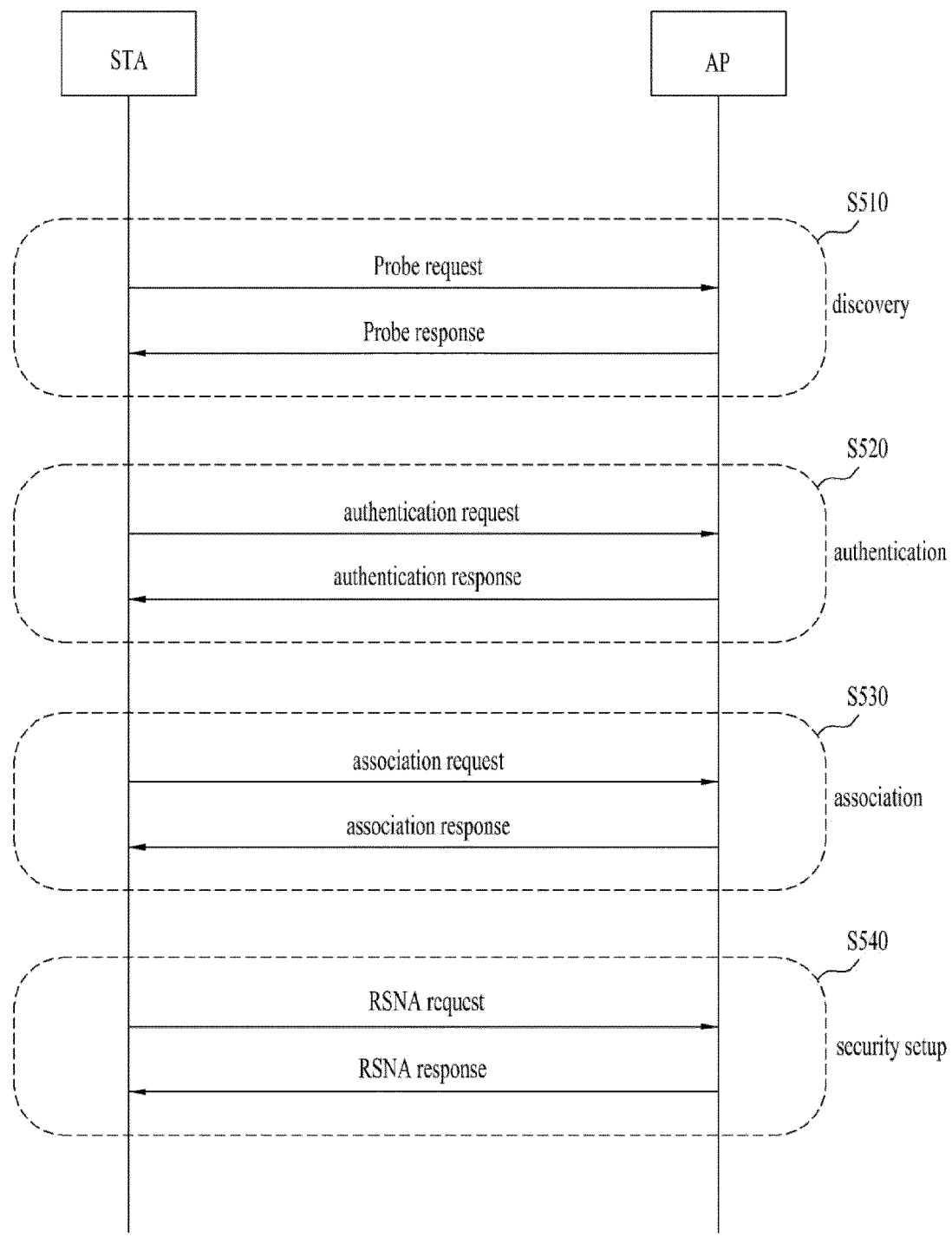
FIG. 3 illustrates a general link setup procedure.

FIG. 3 is a flowchart explaining a general link setup process according to an exemplary embodiment of the present invention.

In order to allow a STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, a STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be a STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning. A STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA based on information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11-based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
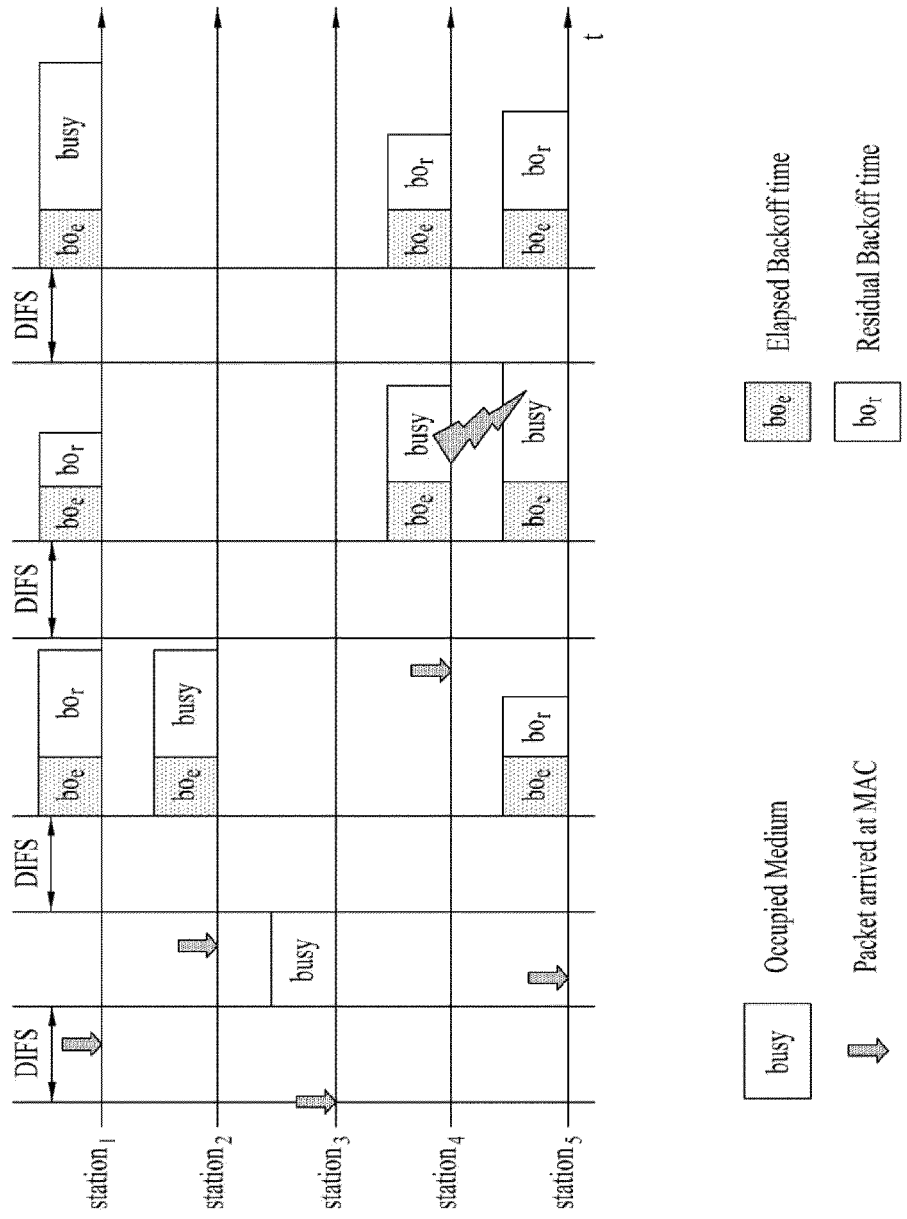
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. A STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 5:
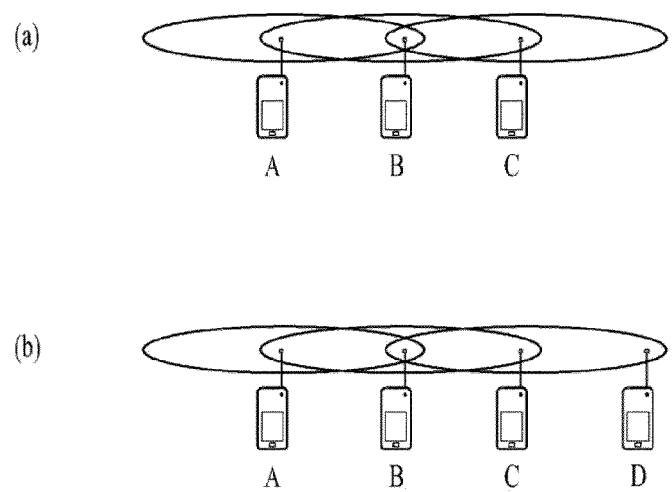
FIG. 5 is an explanatory diagram of a hidden node and an exposed node.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
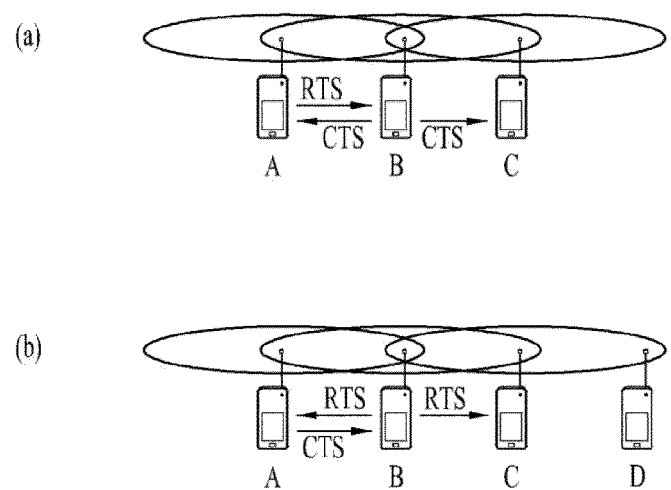
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/ reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unicast frame and a delivery traffic indication map (DTIM) used to indicate a multicast or broadcast frame.

Figure 7:
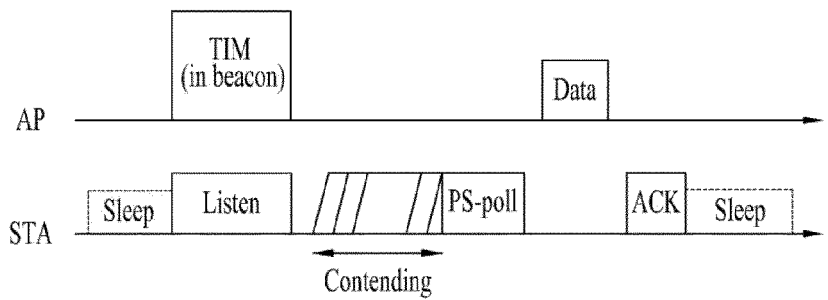
FIGS. 7 to 9 are explanatory diagrams of operation of an STA that has received TIM.
Figure 8:
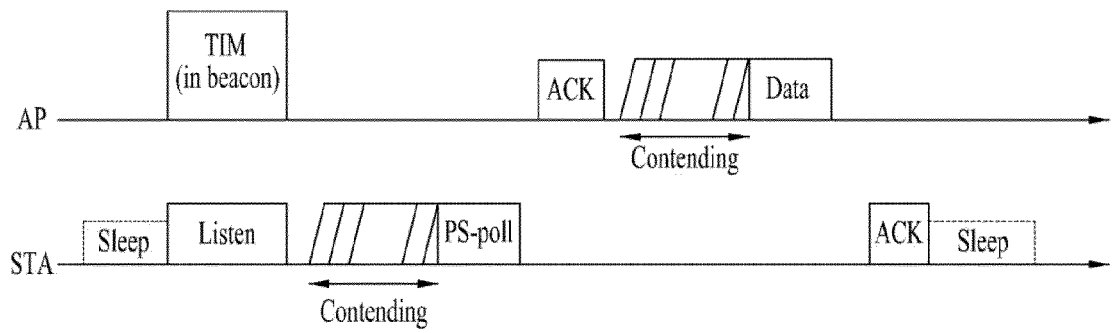
Figure 9:
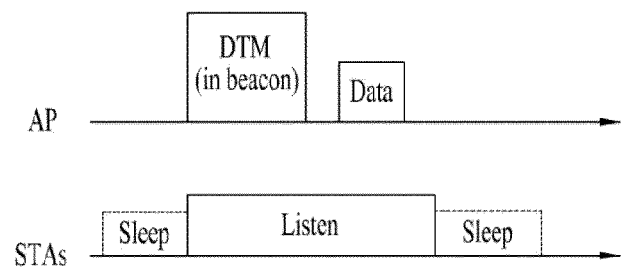

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
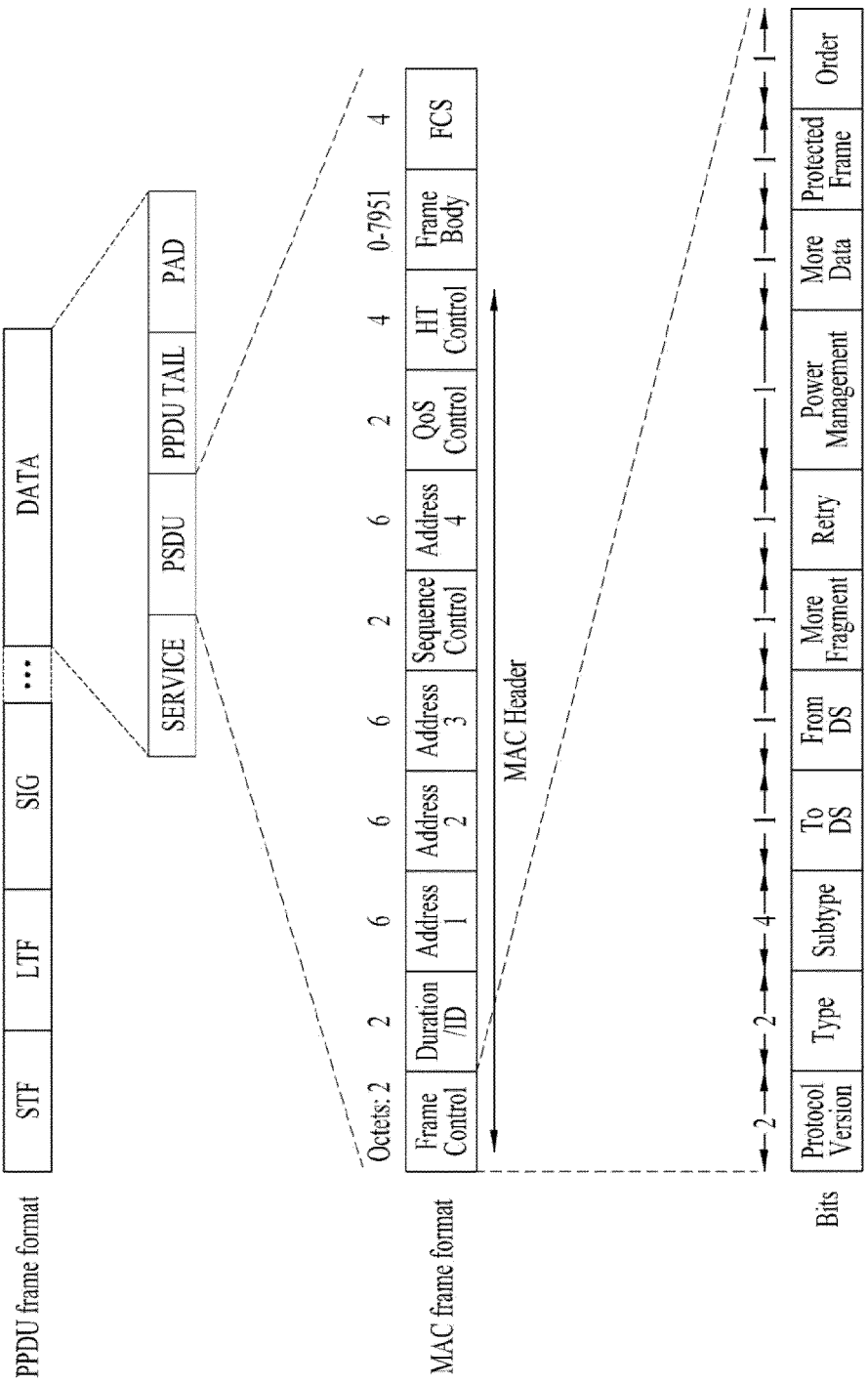
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and sub-type, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Figure 11:
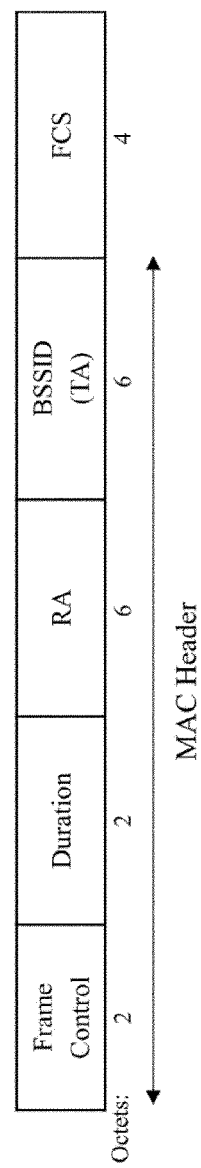
FIG. 11 illustrates a contention free (CF)-END frame.

FIG. 11 illustrates a CF (contention free)-END frame.

It is assumed that the CF-END frame is transmitted by a non-DMG (directional multi-gigabit, 11ad) STA for convenience of description. The CF-END frame may be transmitted to truncate a TXOP duration. Accordingly, a duration field is set to 0 in the CF-END frame. An RA (Receiver Address) field may be set to a broadcast group address. A BSSID field may be set to an STA address included in a relevant AP. However, in the case of a CF-END frame in a non-HT or non-HT duplicate format, which is transmitted from a VHT STA to a VHT AP, an Individual/Group bit of the BSSID field may be set to 1.

Example of HE PPDU Structure

A description will be given of examples of an HE PPDU (High Efficiency Physical layer Protocol Data Unit) format in a wireless LAN system supporting 11ax.

Figure 12:
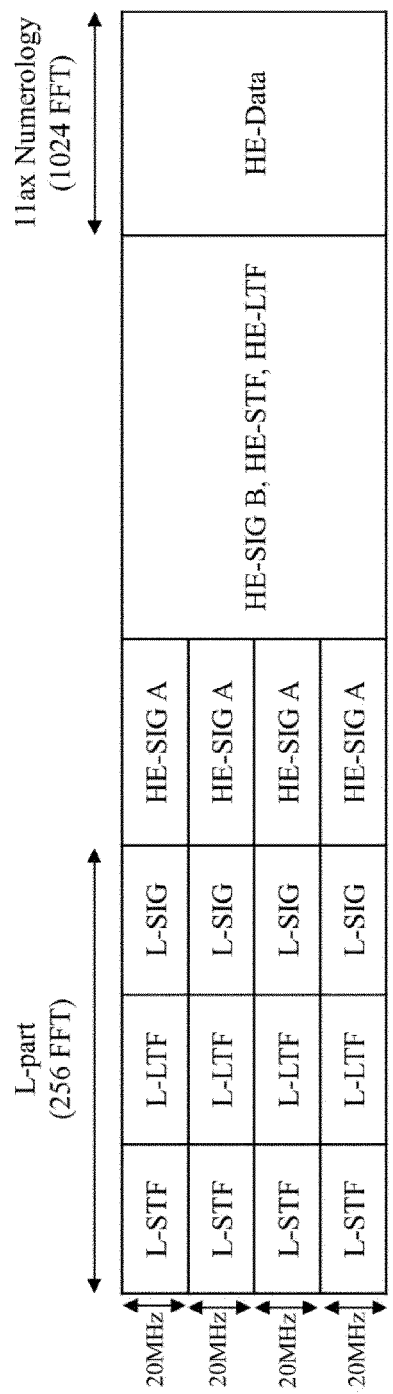
FIG. 12 illustrates an example of an HE PPDU.

FIG. 12 illustrates an example of the HE PPDU. Referring to FIG. 12, an HE-SIG A (or HE-SIG1) field follows an L-Part (e.g., L-STF, L-LTF, L-SIG) and is duplicated every 20 MHz like the L-Part. The HE-SIG A field includes common control information (e.g., BW, GI length, BSS index, CRC, Tail, etc.) for STAs. The HE-SIG A field includes information for decoding the HE PPDU and thus information included in the HE-SIG A field may depend on the format of the HE PPDU (e.g., SU PPDU, MU PPDU, trigger-based PPDU or the like). For example, in the HE SU PPDU format, the HE-SIG A field may include at least one of a DL/UL indicator, HE PPDU format indicator, BSS color, TXOP duration, BW (bandwidth), MCS, CP+LTF length, coding information, the number of streams, STBC (e.g., whether STBC is used), transmission beamforming (TxBF) information, CRC and Tail. In the case of the HE SU PPDU format, the HE-SIG B field may be omitted. In the HE MU PPDU format, the HE-SIG A field may include at least one of a DL/UL indicator, BSS color, TXOP duration, BW, MCS information of a SIG B field, the number of symbols of the SIG B field, the number of HE LTF symbols, indicator indicating whether full band MU-MIMO is used, CP+LTF length, transmission beamforming (TxBF) information, CRC and Tail. In the HE trigger-based PPDU format, an HE-SIG A field may include at least one of a format indicator (e.g., indicating the SU PPDU or trigger-based PPDU), BSS color, TXOP duration, BW, CRC and Tail.

Figure 13:
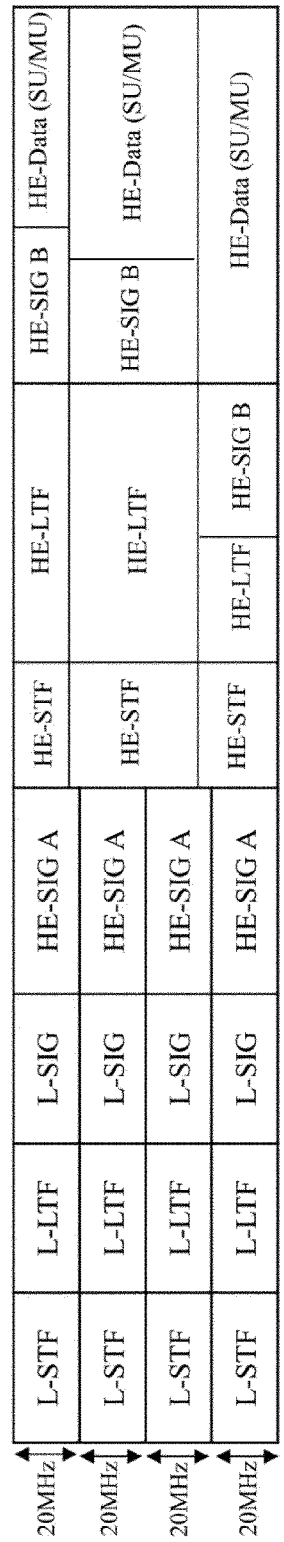
FIG. 13 illustrates another example of the HE PPDU.

FIG. 13 illustrates another example of the HE PPDU. Referring to FIG. 13, the HE-SIG A may include user allocation information, for example, at least one of an STA ID such as a PAID or a GID, allocated resource information and the number of streams (Nsts), in addition to the common control information. Referring to FIG. 13, the HE-SIG B (or HE-SIG2) may be transmitted for each OFDMA allocation. In the case of MU-MIMO, the HE-SIG B is identified by an STA through SDM. The HE-SIG B may include additional user allocation information, for example, an MCS, coding information, STBC (Space Time Block Code) information and transmission beamforming (TXBF) information.

Figure 14:
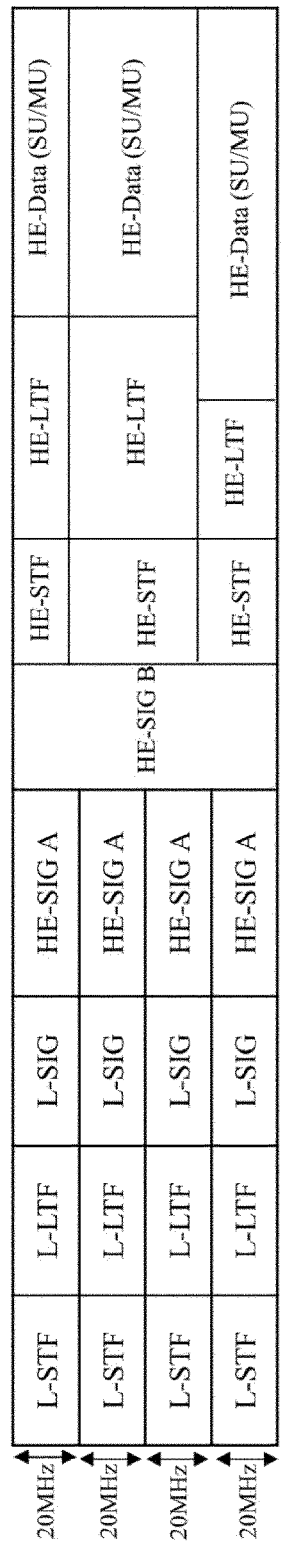
FIG. 14 illustrates another example of the HE PPDU.

FIG. 14 illustrates another example of the HE PPDU. The HE-SIG B is transmitted following the HE-SIG A. The HE-SIG B may be transmitted through the full band based on numerology of the HE-SIG A. The HE-SIG B may include user allocation information, for example, STA AID, resource allocation information (e.g., allocation size), MCS, the number of streams (Nsts), coding, STBC and transmission beamforming (TXBF) information.

Figure 15:
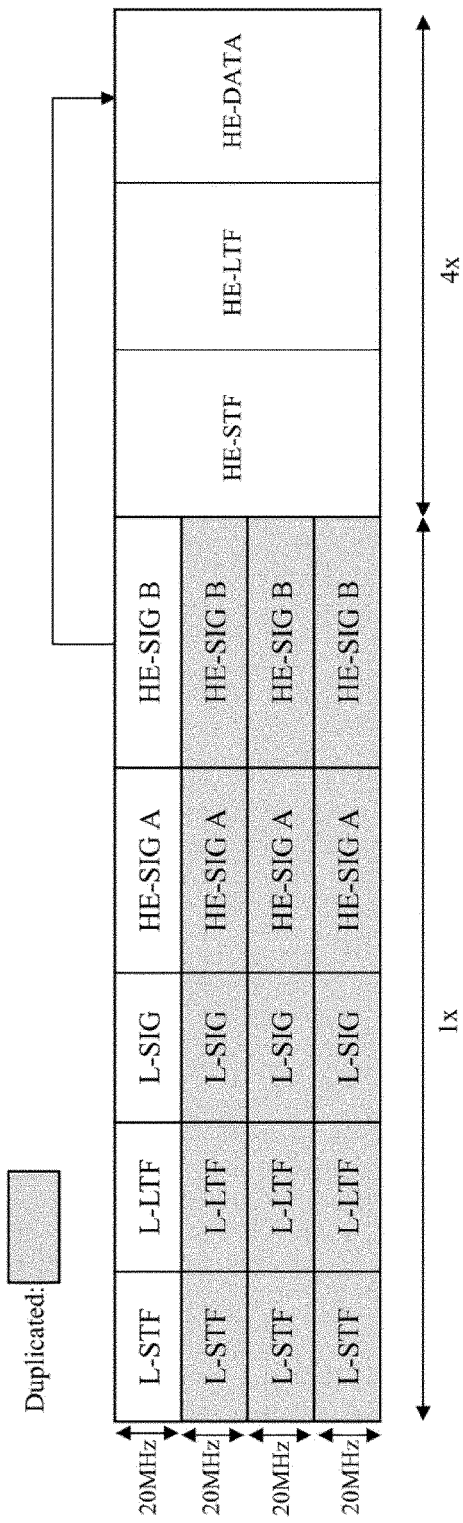
FIG. 15 illustrates another example of the HE PPDU.

FIG. 15 illustrates another example of the HE PPDU. The HE-SIG B may be duplicated per predetermined unit channel. Referring to FIG. 15, the HE-SIG B may be duplicated per 20 MHz. For example, the HE-SIG B can be transmitted in such a manner that the same information is duplicated per 20 MHz in 80 MHz bandwidth.

An STA/AP which has received the HE-SIG B duplicated every 20 MHz may accumulate the received HE-SIG B per 20 MHz channel to improve reliability of HE-SIG B reception.

Since the same signal (e.g., HE-SIG B) is duplicated and transmitted per channel, the gain of accumulated signals is proportional to the number of channels over which the signal is duplicated and transmitted to improve reception performance. In theory, a duplicated and transmitted signal can have a gain corresponding to 3 dB×(the number of channels) compared to the signal before duplication. Accordingly, the duplicated and transmitted HE-SIG B may be transmitted with an increased MCS level depending on the number of channels through which the HE-SIG B is duplicated and transmitted. For example, if MCS0 is used for the HE-SIG B transmitted without being duplicated, MCS1 can be used for the HE-SIG B duplicated and transmitted. Since the HE-SIG B can be transmitted with a higher MCS level as the number of channels for duplication increases, HE-SIG B overhead per unit channel can be reduced.

Figure 16:
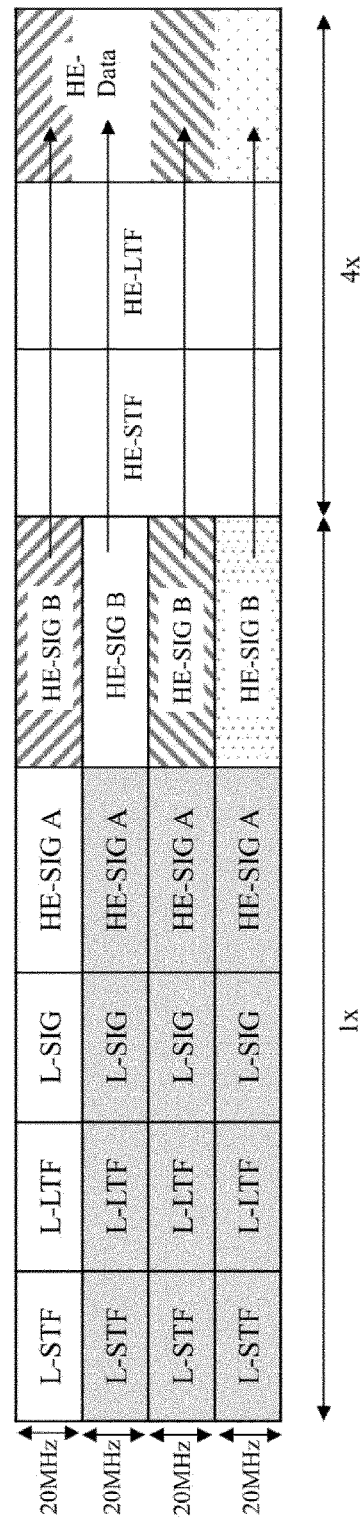
FIG. 16 illustrates another example of the HE PPDU.

FIG. 16 illustrates another example of the HE PPDU. Referring to FIG. 16, the HE-SIG B may include independent information per 20 MHz channel. The HE-SIG B may be transmitted in a 1× symbol structure like the Legacy part (e.g., L-STF, L-LTF, L-SIG) and HE-SIG A. Meanwhile, a length of "L-STF+L-LTF+L-SIG+HE-SIGA+HE-SIGB" needs to be identical in all channels in a wide bandwidth. The HE-SIG B transmitted per 20 MHz channel may include allocation information about the corresponding band, for example, allocation information per user using the corresponding band, user ID, etc. However, the information of the HE-SIG B may vary between bands because the respective bands support different numbers of users and use different resource block configurations. Accordingly, the length of the HE-SIG B may be different for respective channels.

Figure 17:
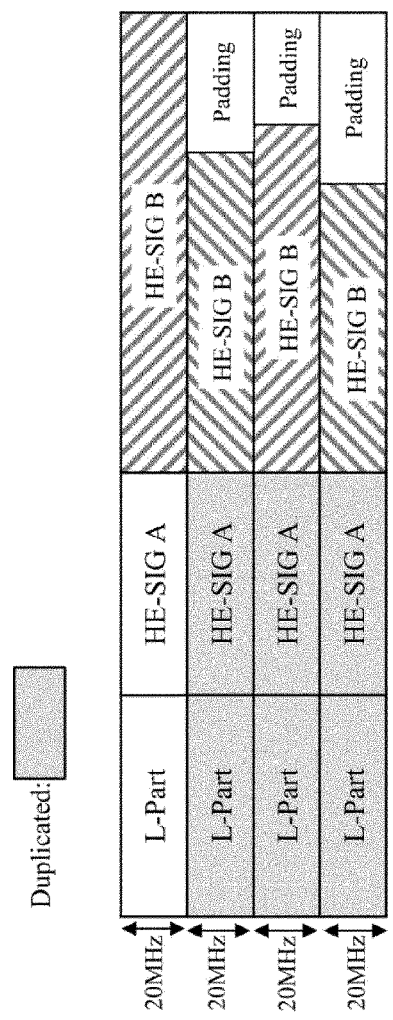
FIGS. 17 and 18 illustrating an HE-SIG B padding method.
Figure 18:

FIG. 17 illustrates an HE-SIG B padding method by which lengths before HE-STF (e.g., lengths to the HE-SIG B) become identical for respective channels. For example, the HE-SIG B may be duplicated by a padding length to align HE-SIG B lengths. As illustrated in FIG. 18, the HE-SIG B corresponding to a necessary padding length may be padded to the HE-SIG B from the start (or end) of the HE-SIG B.

According to an example, one HE-SIG B field can be transmitted when the bandwidth does not exceed 20 MHz. When the bandwidth exceeds 20 MHz, 20 MHz channels may respectively transmit one of a first type HE-SIG B (referred to hereinafter as HE-SIG B [1]) and a second type HE-SIG B (referred to hereinafter as HE-SIG B [2]). For example, HE-SIG B [1] and HE-SIG B [2] may be alternately transmitted. An odd-numbered 20 MHz channel may deliver HE-SIG B [1] and an even-numbered 20 MHz channel may deliver HE-SIG B [2]. More specifically, in the case of a 40 MHz bandwidth, HE-SIG B [1] is transmitted over the first 20 MHz channel and HE-SIG B [2] is transmitted over the second 20 MHz channel. In the case of an 80 MHz bandwidth, HE-SIG B [1] is transmitted over the first 20 MHz channel, HE-SIG B [2] is transmitted over the second 20 MHz channel, the same HE-SIG B [1] is duplicated and transmitted over the third 20 MHz channel and the same HE-SIG B [2] is duplicated and transmitted over the fourth 20 MHz channel. The HE-SIG B is transmitted in a similar manner in the case of a 160 MHz bandwidth.

As described above, the HE-SIG B can be duplicated and transmitted as the bandwidth increases. Here, a duplicated HE-SIG B may be frequency-hopped by 20 MHz from a 20 MHz channel over which an HE-SIG B of the same type is transmitted and transmitted.

HE-SIG B [1] and HE-SIG B [2] may have different content. However, HE-SIG-Bs [1] have the same content. Similarly, HE-SIG Bs [2] have the same content.

According to an embodiment, HE-SIG B [1] may be configured to include resource allocation information about only odd-numbered 20 MHz channels and HE-SIG B [2] may be configured to include resource allocation information about only even-numbered 20 MHz channels. According to another embodiment of the present invention, HE-SIG B [1] may include resource allocation information about at least part of even-numbered 20 MHz channels or HE-SIG B [2] may include resource allocation information about at least part of odd-numbered 20 MHz channels.

The HE-SIG B may include a common field and a user-specific field. The common field may precede the user-specific field. The common field and the user-specific field may be distinguished in a unit of bit(s) instead of a unit of OFDM symbol(s).

The common field of the HE-SIG B includes information for all STAs designated to receive PPDUs in a corresponding bandwidth. The common field may include resource unit (RU) allocation information. All the HE-SIG Bs [1] may have the same content and All the HE-SIG Bs [2] may have the same content. For example, when four 20 MHz channels constituting 80 MHz are classified as [LL, LR, RL, RR], the common field of HE-SIG B [1] may include a common block for LL and RL and the common field of HE-SIG B [2] may include a common block for LR and RR.

The user-specific field of the HE-SIG B may include a plurality of user fields. Each user field may include information specific to an individual STA designated to receive PPDUs. For example, the user field may include at least one of an STA ID, MCS per STA, the number of streams (Nsts), coding (e.g., indication of use of LDPC), DCM indicator and transmission beamforming information. However, the information of the user field is not limited thereto.

UL MU Transmission

Figure 19:
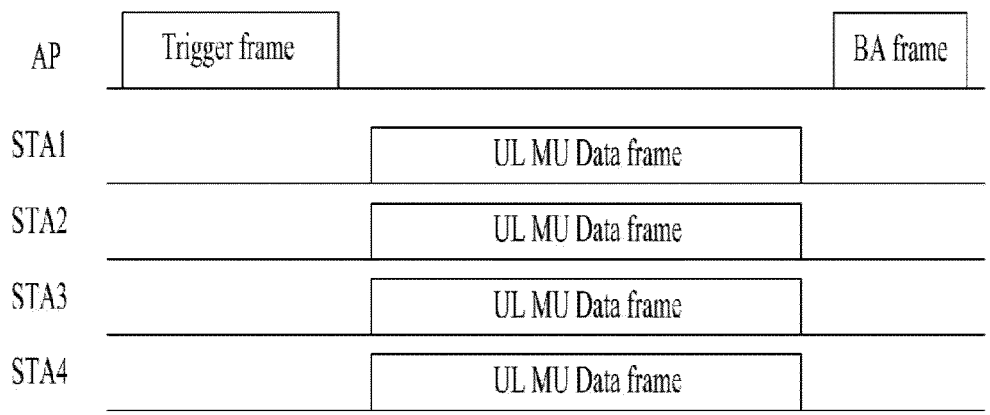
FIG. 19 is an explanatory diagram of uplink multi-user transmission according to an embodiment of the present invention.

FIG. 19 is an explanatory diagram of an uplink multi-user transmission situation according to an embodiment of the present invention.

As described above, an 802.11ax system may employ UL MU transmission. UL MU transmission may be started when an AP transmits a trigger frame to a plurality of STAs (e.g., STA1 to STA4), as illustrated in FIG. 19. The trigger frame may include UL MU allocation information. The UL MU allocation information may include at least one of resource position and size, STA IDs or reception STA addresses, MCS and MU type (MIMO, OFDMA, etc.). Specifically, the trigger frame may include at least one of (i) a UL MU frame duration, (ii) the number of allocations (N) and (iii) information per allocation. The information per allocation may include information per user (Per user Info). The information per allocation may include at least one of an AID (AIDs corresponding to the number of STAs are added in the case of MU), power adjustment information, resource (or tone) allocation information (e.g., bitmap), MCS, the number of streams (Nsts), STBC, coding and transmission beamforming information.

As illustrated in FIG. 19, the AP may acquire TXOP to transmit the trigger frame through a contention procedure to access media. Accordingly, the STAs may transmit UL data frames in a format indicated by the AP after SIFS of the trigger frame. It is assumed that the AP according to an embodiment of the present invention sends an acknowledgement response to the UL data frames through a block ACK (BA) frame.

Figure 20:
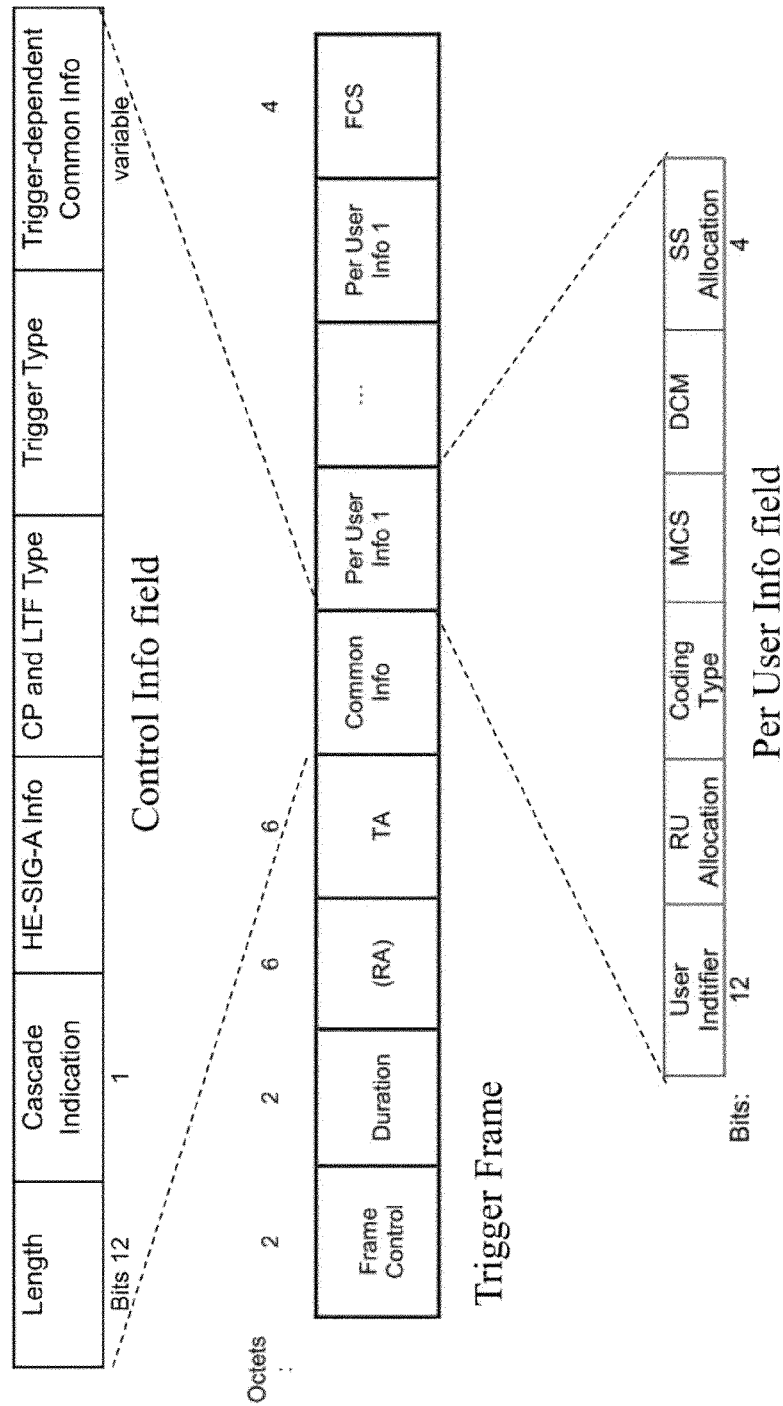
FIG. 20 illustrates a trigger frame format according to an embodiment of the present invention.

FIG. 20 illustrates a trigger frame format according to an embodiment.

Referring to FIG. 20, the trigger frame may include at least one of a frame control field, a duration field, an RA (recipient STA address) field, a TA (transmitting STA address) field, a common information field, one or more Per User Info fields and FCS (Frame Check Sum). The RA field indicates the address or ID of a recipient STA and may be omitted according to embodiments. The TA field indicates the address of a transmitting STA.

The common information field may include at least one of a length subfield, a cascade indication subfield, an HE-SIG A information subfield, a CP/LTF type subfield, a trigger type subfield and a trigger-dependent common information subfield. The length subfield indicates the L-SIG length of a UL MU PPDU. The cascade indication indicates whether there is transmission of a subsequent trigger frame following the current trigger frame. The HE-SIG A information subfield indicates content to be included in the HE-SIG A of the UL MU PPDU. The CP/LTF type subfield indicates a CP and HE LTF type included in the UL MU PPDU. The trigger type subfield indicates the type of the trigger frame. The trigger frame may include common information specific to the type and information per user (Per User Info) specific to the type. For example, the trigger type may be set to one of a basic trigger type (e.g., type 0), beamforming report poll trigger type (e.g., type 1), MU-BAR (Multi-user Block Ack Request) type (e.g., type 2) and MU-RTS (multi-user ready to send) type (e.g., type 3). However the trigger type is not limited thereto. When the trigger type is MU-BAR, the trigger-dependent common information subfield may include a GCR (Groupcast with Retries) indicator and a GCR address.

The Per User Info field may include at least one of a user ID subfield, an RU allocation subfield, a coding type subfield, an MCS subfield, a DCM (dual sub-carrier modulation) subfield, an SS (spatial stream) allocation subfield and a trigger dependent Per User Info subfield. The user ID subfield indicates the AID of an STA which will use a corresponding resource unit to transmit MPDU of the UL MU PPDU. The RU allocation subfield indicates a resource unit used for the STA to transmit the UL MU PPDU. The coding type subfield indicates the coding type of the UL MU PPDU transmitted by the STA. The MCS subfield indicates the MCS of the UL MU PPDU transmitted by the STA. The DCM subfield indicates information about double carrier modulation of the UL MU PPDU transmitted by the STA. The SS allocation subfield indicates information about spatial streams of the UL MU PPDU transmitted by the STA. In the case of MU-BAR trigger type, the trigger-dependent Per User Info subfield may include BAR control and BAR information.

NAV (Network Allocation Vector)

A NAV may be understood as a timer for protecting TXOP of a transmitting STA (e.g., TXOP holder). An STA may not perform channel access during a period in which a NAV configured in the STA is valid so as to protect TXOP of other STAs.

A current non-DMG STA supports one NAV. An STA which has received a valid frame can update the NAV through the duration field of the PSDU (e.g., the duration field of the MAC header). When the RA field of the received frame corresponds to the MAC address of the STA, however, the STA does not update the NAV. When a duration indicated by the duration field of the received frame is greater than the current NAV value of the STA, the STA updates the NAV through the duration of the received frame.

Figure 21:
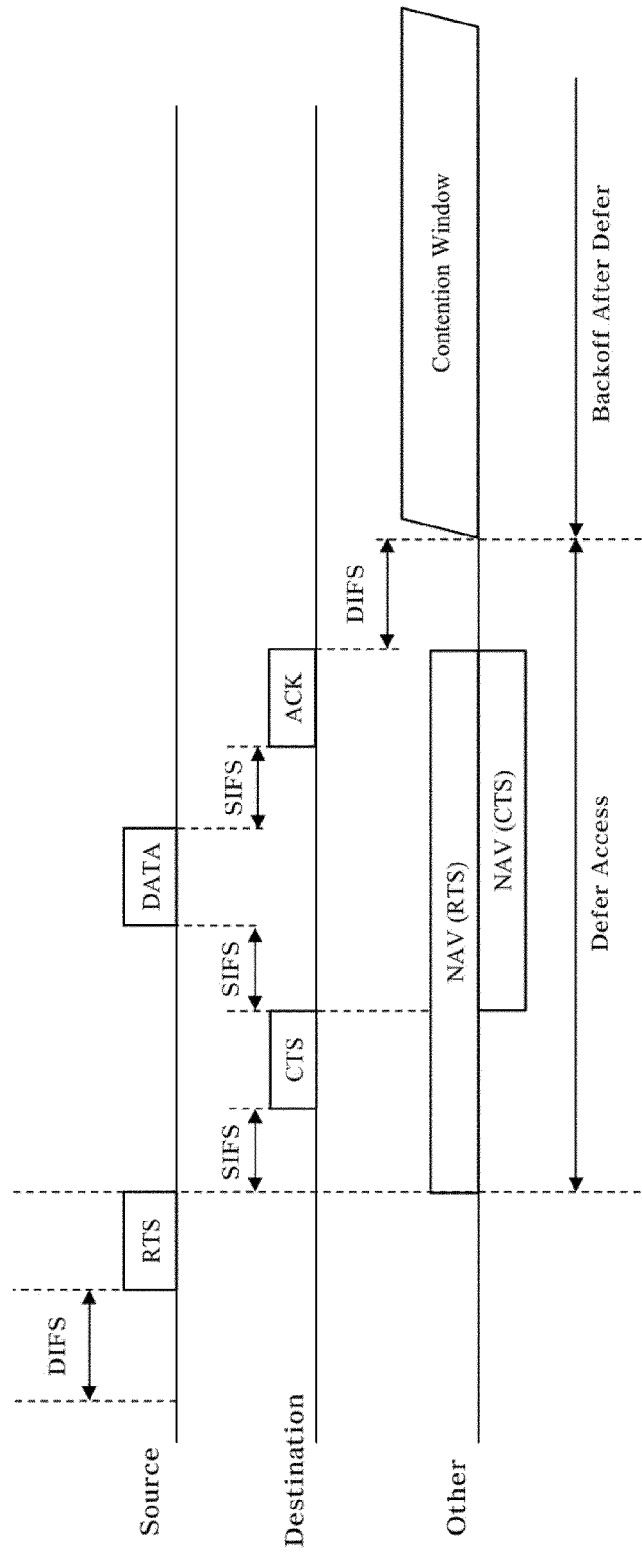
FIG. 21 illustrates an example of NAV setting.

FIG. 21 illustrates an example of NAV setting.

Referring to FIG. 21, a source STA transmits an RTS frame and a destination STA transmits CTS frame. As described above, the destination STA designated as a recipient through the RTS frame does not set a NAV. Some of other STAs may receive the RTS frame and set NAVs and others may receive the CTS frame and set NAVs.

If the CTS frame (e.g., PHY-RXSTART.indication primitive) is not received within a predetermined period from a timing when the RTS frame is received (e.g., PHY-RXEND. indication primitive for which MAC corresponds to the RTS frame is received), STAs which have set or updated NAVs through the RTS frame can reset the NAVs (e.g., 0). The predetermined period may be (2*aSIFSTime+CTS_Time+ aRxPHYStartDelay+2*aSlotTime). The CTS_ Time may be calculated based on the CTS frame length indicated by the RTS frame and a data rate.

Although FIG. 21 illustrates setting or update of a NAV through the RTS frame or CTS frame for convenience, NAV setting/resetting/update may be performed based on duration fields of various frames, for example, non-HT PPDU, HT PPDU, VHT PPDU and HE PPDU (e.g., the duration field of the MAC header of the MAC frame). For example, if the RA field of the received MAC frame does not correspond to the address of an STA (e.g., MAC address), the STA may set/reset/update the NAV.

TXOP (Transmission Opportunity) Truncation

Figure 22:
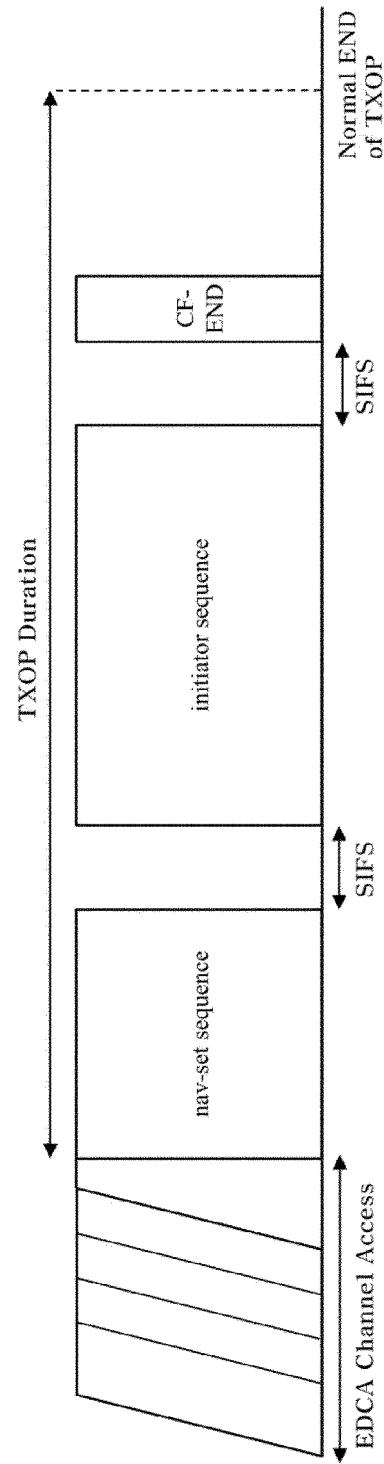
FIG. 22 illustrates an example of TXOP truncation.

FIG. 22 illustrates an example of TXOP truncation.

A TXOP holder STA may indicate to truncate TXOP by transmitting a CF-END frame. AN STA can reset the NAV (e.g., set the NAV to 0) upon reception of a CF-END frame or CF-END+CF-ACK frame.

When an STA that has acquired channel access through EDCA empties a transmission queue thereof, the STA can transmit a CF-END frame. The STA can explicitly indicate completion of TXOP thereof through transmission of the CF-END frame. The CF-END frame may be transmitted by a TXOP holder. A non-AP STA that is not a TXOP holder cannot transmit the CF-END frame. A STA which has received the CF-END frame resets the NAV at a time when a PPDU included in the CF-END frame is ended.

Referring to FIG. 22, an STA that has accessed a medium transmits a sequence (e.g., RTS/CTS) for NAV setting.

After SIFS, a TXOP holder (or TXOP initiator) and a TXOP responder transmit and receive PPDUs (e.g., initiator sequence). The TXOP holder truncates a TXOP by transmitting a CF-END frame when there is no data to be transmitted within the TXOP.

STAs which have received the CF-END frame reset NAVS thereof and can start contending for medium access without delay.

As described above, a TXOP duration is set through the duration field of the MAC header in the current wireless LAN system. That is, a TXOP holder (e.g., Tx STA) and a TXOP responder (e.g., Rx STA) include whole TXOP information necessary for transmission and reception of frames in duration fields of frames transmitted and received therebetween and transmit the frames. Third party STAs other than the TXOP holder and the TXOP responder check the duration fields of frames exchanged between the TXOP holder and the TXOP responder and sets/updates NAVs to defer use of channels until NAV periods.

NAV Management

Figure 23:
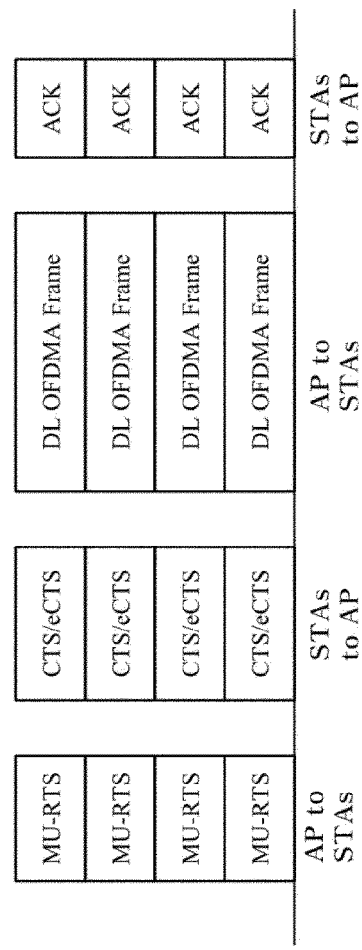
FIG. 23 is a conceptual diagram illustrating a method for transmitting/receiving an RTS frame and a CTS frame based on an MU so as to perform DL OFDMA transmission.

FIG. 23 is a conceptual diagram illustrating a method for transmitting/receiving an RTS frame and a CTS frame based on an MU so as to perform DL OFDMA transmission.

Referring to FIG. 23, prior to transmission of the DL OFDMA frame, the AP may transmit an MU-RTS frame to STAs. The MU-RTS frame may include ID information of multiple STAs scheduled to answer the corresponding RTS frame, and channel information (e.g., a start channel position, the number of channels and/or the channel bandwidth width) to be used as a destination of the CTS/eCTS frame.

Assuming that the STAs have received an MU-RTS frame and ID information of each STA is present in the MU-RTS frame, the STAs may transmit CTS or eCTS based on information contained in the MU-RTS frame. eCTS may be a new CTS frame including not only information contained in the legacy CTS frame but also additional information (e.g., TA, idle channel information, and the like).

11ax STA (e.g., third party) having received the MU-RTS frame may set or update its own NAV based on duration information contained in the MU-RTS frame, when its own ID information is not contained in the MU-RTS frame.

Meanwhile, when the AP having transmitted the MU-RTS does not receive CTS/eCTS from the STAs, the AP may not transmit the DL OFDMA frame. In this case, STAs (e.g., the 11ax STAs having received the MU-RTS frame not including its own ID information or the legacy STA having received the MU-RTS frame) having set/updated the NAV may continuously maintain the NAV during a predetermined time indicated by the duration field of the MU-RTS frame, such that the corresponding STAs are unable to use the channel.

In order to solve the above-mentioned problems, the embodiments of the present invention will hereinafter be given below. The MU-RTS may be a frame for triggering CTS/eCTS frame transmission so as to simultaneously receive the CTS/eCTS frame from several STAs. The MU-RTS may be a modification of the legacy RTS frame, may be a modification of the trigger frame scheduled to trigger MU transmission, or may be a newly defined frame. The trigger frame for triggering the MU transmission may refer to FIG. 20. For example, the MU-RTS frame may include a common information field and/or an individual user information field as shown in FIG. 20, but not limited thereto.

Indexes to be described in the following embodiments are allocated for convenience of description and better understanding of the present invention. The embodiments having different indexes are not always implemented independently from each other, and the embodiments having different indexes may construct a single invention by combination thereof.

Embodiment 1

As described above, after the AP transmits the MU-RTS, if the AP does not receive CTS/e-CTS from the STAs at all, the AP does not transmit the DL OFDMA frame. In this case, in order to release the NAV of other STAs (e.g., third party) set by the MU-RTS, the AP may transmit a CF-END frame over a channel through which the MU-RTS is transmitted.

Figure 24:
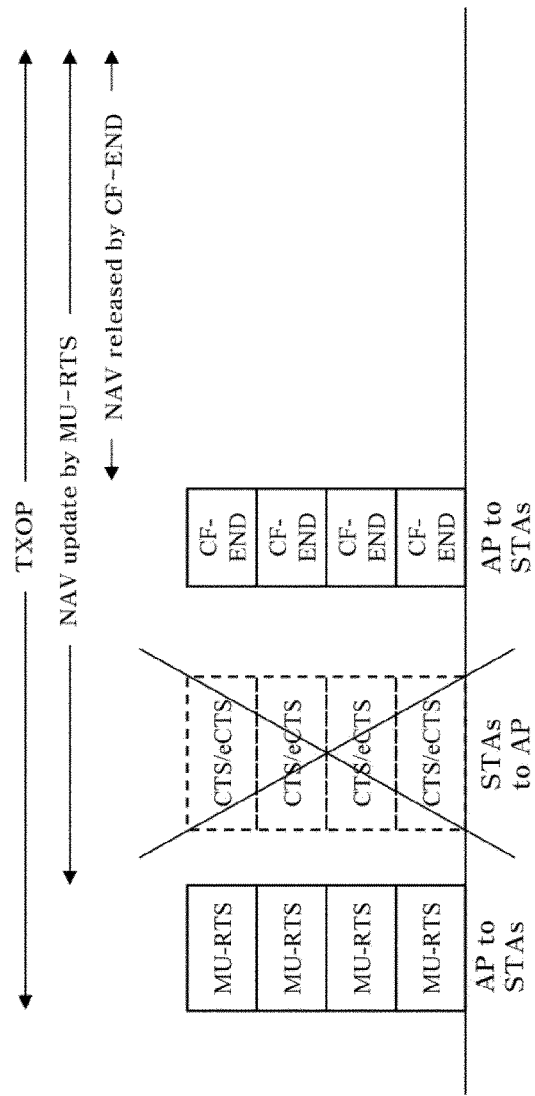
FIG. 24 is a conceptual diagram illustrating a method for allowing an AP having not received a CTS/e-CTS to transmit a CF-END frame according to an embodiment of the present invention.

FIG. 24 is a conceptual diagram illustrating a method for allowing an AP having not received a CTS/e-CTS to transmit a CF-END frame according to an embodiment of the present invention.

Referring to FIG. 24, the CF-END frame may be transmitted to each channel to which the MU-RTS frame is transmitted. Therefore, the legacy STAs (e.g., non-HE STA such as 11a/b/g/n/ac) having received the CF-END or the 11ax STA (e.g., third party HE-STA) may reset the NAV.

However, CF-END frame transmission of the above-mentioned AP may also reset the NAV by another frame (e.g., CTS, data, and another RTS frame) different from the MU-RTS frame, and may affect transmission of another frame.

For example, it is assumed that the NAV set by another frame has been present in the third party STA and the corresponding NAV has been updated by the MU-RTS. In this case, when the AP transmits the CF-END frame, the NAV of the third party STA is reset (e.g., NAV=0). Since the NAV is reset, it is impossible to protect a TXOP of another frame that has been transmitted prior to MU-RTS transmission.

Embodiment 1-1

In accordance with one embodiment, the AP may transmit the legacy RTS to a single STA without transmitting the CF-END, and may not transmit the DL frame irrespective of CTS reception.

Preferably, duration contained in the legacy RTS may include information regarding a duration longer than the duration contained in the previously transmitted MU-RTS (e.g., for NAV update). In this case, the AP may include an indicator (e.g., No CTS TX indicator) for preventing the CTS from being transmitted to the legacy RTS, and may then transmit the resultant information. Therefore, the STA having received the legacy RTS may not transmit the CTS even though the RA contained in the legacy RTS is identical to an address of the STA.

Figure 25:
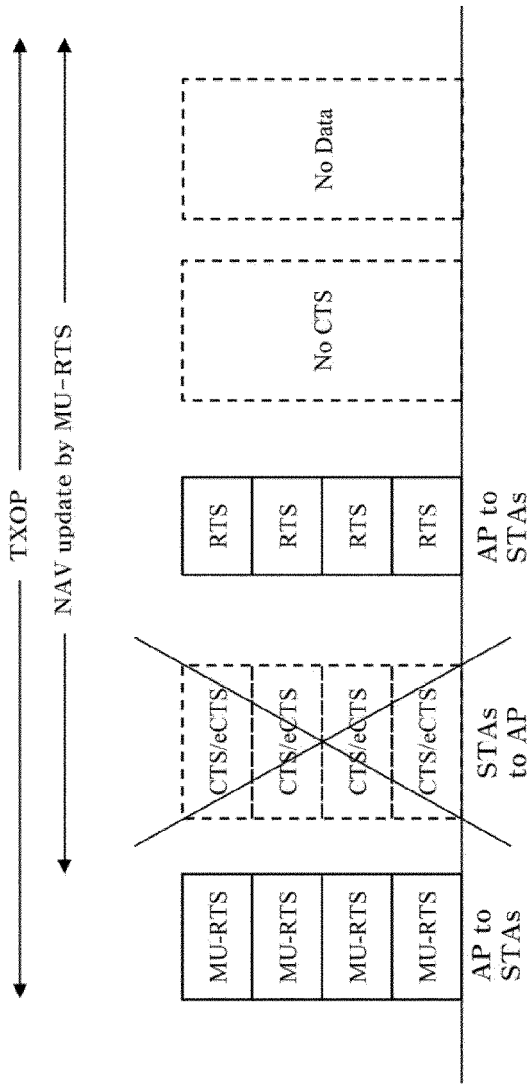
FIG. 25 is a conceptual diagram illustrating a method for allowing the AP having not received a CTS to transmit a legacy RTS according to an embodiment of the present invention.

FIG. 25 is a conceptual diagram illustrating a method for allowing the AP having not received the CTS to transmit the legacy RTS according to an embodiment of the present invention. Referring to FIG. 25, after the AP transmits the legacy RTS, any one of the APs may not transmit the CTS and the AP may also not transmit the DATA frame.

STAs having received the legacy RTS frame may reset their own NAV because the STAs do not receive the CTS frame within a predetermined time.

Since the legacy RTS having been transmitted from the AP is a non-HE format (e.g., since the legacy RTS is not based on the 11ax-based MU-RTS), NAV resetting may be induced to the legacy STA. In more detail, the MU-RTS frame is a MAC frame format newly defined in the HE, such that the non-HE STA is unable to recognize the presence of the MU-RTS frame. HE-STAs may recognize the presence of MU-RTS frames. When the CTS is not transmitted within a predetermined time, the HE-STAs may also reset the NAV. However, the non-HE STA does not recognize the MU-RTS frame, such that the NAV is not reset even when the CTS is not transmitted within the predetermined time. In order to reset the NAV of the non-HE STAs, the AP may transmit the RTS frame (or the above-mentioned CF-End frame) based on the non-HE format.

Meanwhile, the following embodiment 1-1 allows the STAs to perform NAV resetting, such that there occurs the problem in which the NAV having been set/updated by another frame before execution of the MU-RTS or the legacy RTS is also reset.

Embodiment 2

11ax STAs have already recognized that the received frame is the MU-RTS frame. Thus, assuming that the ID of each 11ax STA is not contained in the MU-RTS frame and the duration contained in the MU-RTS frame is higher than a current NAV value, the 11ax STAs may update the NAV using the duration of the MU-RTS frame.

In accordance with one embodiment, the STA may store a current NAV value before updating the NAV. For convenience of description, the current NAV value obtained before the NAV stored by the STA is updated will hereinafter be referred to as "Old NAV".

For example, when the STA does not receive the frame within a predetermined time from the MU-RTS reception time, the STA may update the NAV using the pre-stored old NAV timer, instead of resetting the NAV. For example, the present invention time may be denoted by "(2*aSIFSTime)+ (CTS_Time)+aRxPHYStartDelay+(2*aSlotTime)", without being limited thereto.

If the STA receives the frame within the predetermined time from the MU-RTS reception time, the STA may also reset the pre-stored Old NAV value.

Meanwhile, the Old NAV value prestored by the STA may be reduced according to lapse of a time based on the prestored timer. As a result, the stored Old NAV timer may be set to zero '0' at a certain time.

Figure 26:
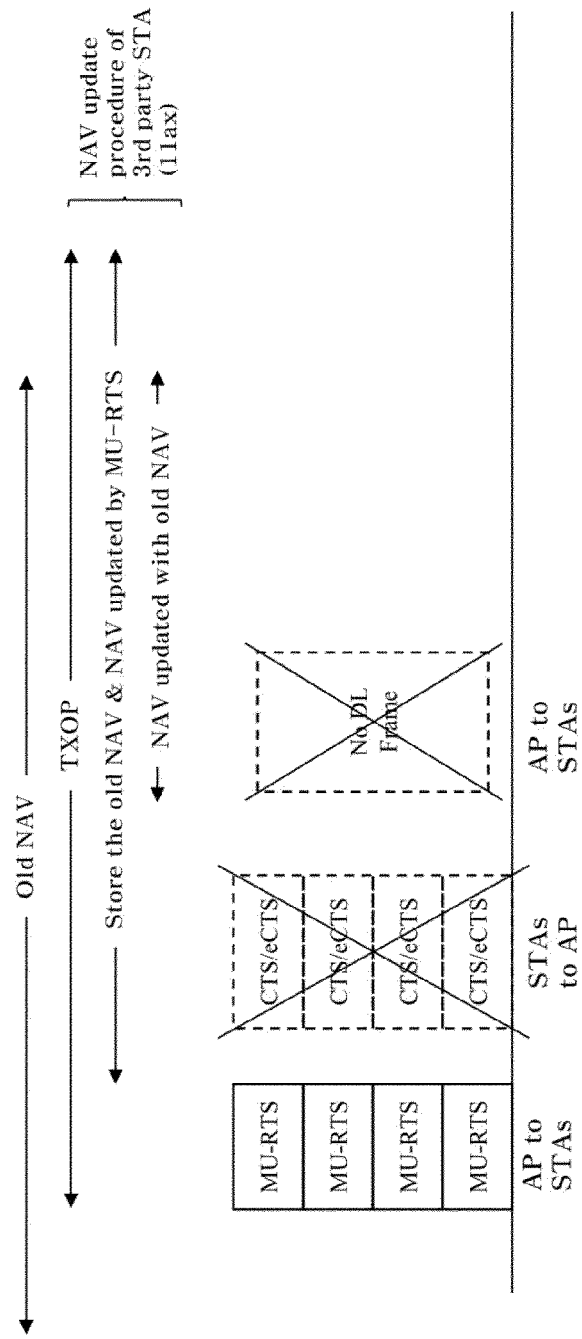
FIG. 26 is a conceptual diagram illustrating a NAV management method according to an embodiment of the present invention.

FIG. 26 is a conceptual diagram illustrating a NAV management method according to an embodiment of the present invention.

Referring to FIG. 26, the 3$^{rd}$ Party STAs (e.g., 11ax STAs, IDs of which are contained in the MU RTS) having received the MU-RTS may store the previous NAV value (e.g., irrespective of whether the corresponding value is set to zero '0') and may update the the NAV using the duration of the MU-RTS, when the duration value of the MU-RTS is higher than the current NAV value of each $3^{rd}$ party STA.

If the frame is not received within a predetermined time after MU-RTS reception, the $3^{rd}$ party STA may update the NAV through the stored Old NAV. In FIG. 26, it is assumed that CTS/eCTS and DL frames have not been transmitted within the predetermined time.

If the frame (e.g., the DL frame from the AP) is received within the predetermined time after MU-RTS reception, the 3rd party STA may delete the stored Old NAV (e.g., the stored Old NAV is set to zero '0').

Meanwhile, the AP may transmit the MU-RTS frame, and may then transmit the CF-END frame to STAs when the AP does not receive the CTS/eCTS frame. In this case, non-HE STAs and HE STAs may perform truncation of the NAV based on the received CF-END frame. Although the non-HE STAs perform NAV resetting based on the CF-END, the HE STAs may maintain the NAV until the current NAV is ended even when the HE STAs have received the CF-END from the AP having transmitted the MU-RTS, without being limited thereto.

In accordance with one embodiment, although the HE STAs receive the RTS frame, the HE STAs may also operate in the same manner as in the MU-RTS frame reception. For example, it is assumed that the HE STA receives the RTS frame and the NAV value calculated based on the duration of the RTS frame is higher than the current NAV value. In this case, the HE STA may first store the current NAV timer, and may update the NAV using the duration value of the RTS frame. If the HE STA does not receive the frame during a predetermined time after reception of the RTS frame, the HE STA may update the NAV using the stored Old NAV. In contrast, when the HE STA receives the frame within the predetermined time, the HE STA may reset the stored old NAV.

Meanwhile, the STA may also store BSS associated information (e.g., at least one of BSSID, BSS Color, and TA) of the frame used for NAV update when the Old NAV is stored. Therefore, the STA may confirm whether the corresponding NAV is updated by the frame having a certain BSSID/BSS Color/TA.

In accordance with another embodiment, when the STA receives the RTS/MU-RTS, the STA may remain the legacy NAV without updating the NAV using the duration of the RTS/MU-RTS, and may additionally store the NAV timer corresponding to the duration of the RTS/MU-RTS. If the frame (e.g., PHY-RXSTART.Indication) is received without a predetermined time, the STA may update the NAV using a higher NAV value from among the additionally stored NAV and the NAV caused by the received frame. If the frame is not received within the predetermined time, the STA may also delete the NAV information caused by the additionally stored RTS/MU-RTS without updating the NAV.

Embodiment 2-1

In accordance with one embodiment, when the STA updates the NAV through the received RTS/MU-RTS and does not receive the frame within the predetermined time from the RTS/MU-RTS reception time (e.g., does not receive PHY-RXSTART.Indication), the STA may continuously maintain the NAV without resetting the NAV. In this case, NAV update may indicate that the STA sets the NAV to the duration contained in the RTS/MU-RTS when NAV≠0 is given at the RTS/MU-RTS reception time.

Assuming that the STA initially sets the NAV through the received RTS/MU-RTS, if the STA does not receive the frame within the predetermined time from the RTS/MU-RTS reception time, the STA may reset the NAV. To this end, the STA may store a variable corresponding to the NAV update indicator along with the NAV timer. If NAV=0 is given at the RTS/MU-RTS reception time, the NAV initial setting may indicate that the STA newly sets the NAV to the duration contained in RTS/MU-RTS.

For example, the NAV update indicator may indicate whether the NAV of the STA is an initial setting (e.g., NAV is newly set from NAV=0), or may indicate whether the NAV is updated (e.g., NAV is updated from NAV≠0). For example, "NAV update indicator=0" may indicate NAV initial setting, and "NAV update indicator=1" may indicate NAV update, without being limited thereto.

For example, it is assumed that the STA sets/updates the NAV through the received RTS/MU-RTS, and does not receive the frame within the predetermined time from the RTS/MU-RTS reception time. In this case, "NAV update indicator=0" may indicate that the STA may perform NAV resetting. For example, the predetermined time may be denoted by [(2*aSIFSTime)+(CTS_Time)+aRxPHYStart-Delay+(2*aSlotTime)], but not limited thereto. In contrast, "NAV update indicator=1" may indicate that the STA does not reset the NAV. This example may also be applied to the case in which the frame (e.g., CF-END) used for TXOP truncation is received. For example, when the STA receives the CF-End frame and the NAV update indicator is set to zero '0', the NAV is reset. In contrast, when the NAV update indicator is set to '1', the NAV may remain unchanged without resetting the NAV.

Embodiment 2-2

In accordance with one embodiment, when the NAV is updated, the STA may store a difference between the current NAV value and the NAV value set through updating. The difference between the current NAV value and the NAV value set through updating will hereinafter be referred to as a NAV difference value.

The NAV difference value may be denoted by [NAV value to be newly updated (e.g., calculated using the duration value of the received frame)−the current stored NAV value] at the NAV update time point. For example, assuming that the STA updates the NAV, the NAV value to be updated is set to 50 and the current NAV is set to 30, the NAV difference value is 20 (=50−20).

Thereafter, when the NAV needs to be reset, the STA may update the NAV to [Current NAV value−NAV difference value]. The case in which the NAV needs to be reset may indicate one case in which the CF-END frame is received or the other case in which the frame is not received within the predetermined time from the RTS/MU-RTS reception (e.g., PHY-RXSTART.Indication does not exist). However, the scope or spirit of the present invention is not limited thereto.

For example, when the STA desires to update the NAV upon receiving the frame, the STA may calculate/store the NAV difference value, and may update the NAV. Thereafter, when the NAV resetting is needed, the STA may perform the NAV update using a specific value calculated through the residual NAV value 'A'(e.g., the current NAV value at a specific time at which resetting is needed) and the NAV difference value 'B', without immediately resetting the NAV. For example, the STA may update the NAV to 'A−B'.

If 'A−B' is equal to or less than zero '0', the STA may reset the NAV (e.g., set to zero '0').

In more detail, it is assumed that the NAV difference value is set to 20 and the current NAV is set to 40 at a specific time at which the NAV is to be reset. STA may update the current NAV to '(40−20)=20'. In contrast, when the NAV difference value is set to 40 and the current NAV value is set to 20 at a specific time at which the NAV is to be reset, (20−40)=−20 is obtained, such that the STA may reset the NAV. This example is not limited to the case in which the MU RTS frame is received, and may also be applied to the other case in which the CF-End frame is received.

In accordance with another embodiment, the STA may update the NAV to the NAV difference value at a specific time at which the NAV reset is needed.

Embodiment 3

In accordance with one embodiment, the AP having transmitted the MU-RTS may immediately transmit the MU-RTS frame when the AP does not receive the CTS/e-CTS. The MU-RTS frame to be transmitted later may include information regarding other STAs different from the STAs contained in the previously transmitted MU-RTS.

Figure 27:
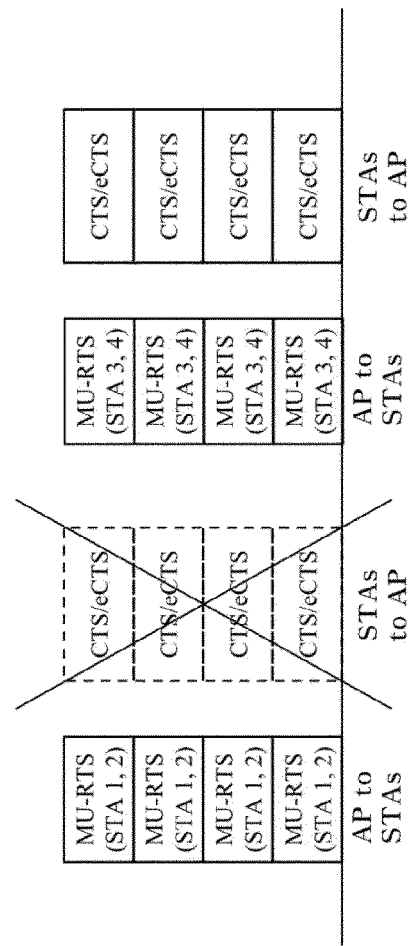
FIG. 27 is a conceptual diagram illustrating an MU-RTS transmission method according to an embodiment of the present invention.

FIG. 27 is a conceptual diagram illustrating an MU-RTS transmission method according to an embodiment of the present invention.

Referring to FIG. 27, it is assumed that, although the AP transmits the MU-RTS frame for STA 1 and STA 2, the AP does not yet receive the CTS/e-CTS frame from both the STA 1 and the STA 2. In this case, the AP may transmit the MU-RTS frame for STA 3 and STA 4. Therefore, upon receiving the CTS/eCTS frame from the STA 3 and/or the STA 4, the AP may transmit the DL frame to the STA 3 and/or the STA 4.

In the meantime, according to one embodiment, upon receiving the CTS/eCTS frame, the AP may also transmit the MU-RTS to the STAs of the same group, instead of transmitting the MU-RTS to STAs of other groups. Alternatively, when the CTS/eCTS is not received, the AP may transmit another control/management/data frame instead of transmitting the MU-RTS, but not limited thereto.

Summary of the Above-Mentioned Embodiments

Figure 28:
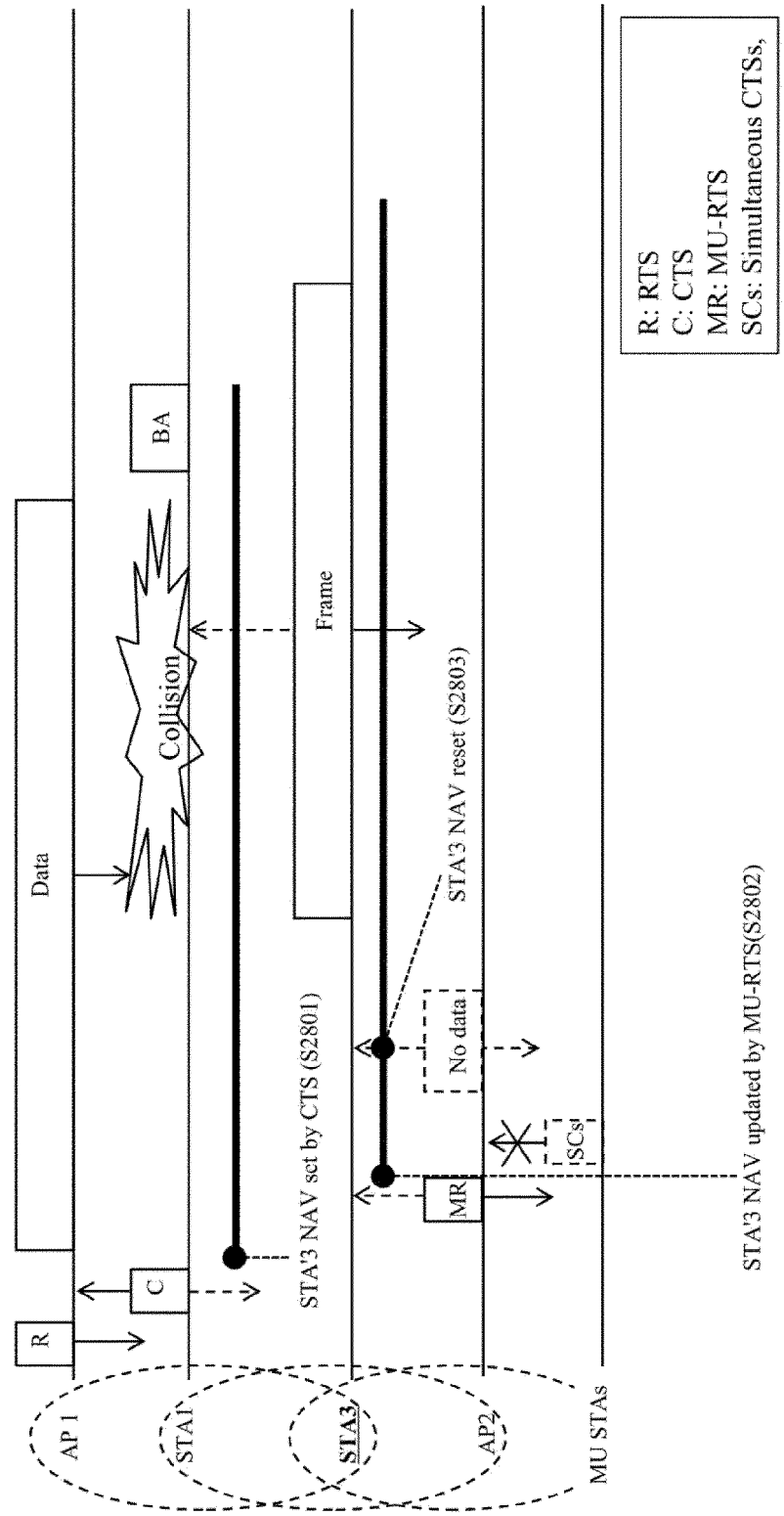
FIG. 28 is a conceptual diagram illustrating an example of frame collision caused by NAV reset according to one embodiment of the present invention.

FIG. 28 is a conceptual diagram illustrating an example of frame collision caused by NAV reset according to one embodiment of the present invention.

Referring to FIG. 28, NAV of the STA3 may be denoted by a bold solid line. For convenience of description, NAV before updating and NAV after updating are respectively shown in FIG. 28. However, the number of NAVs actually operating in the STA 3 may be only one, but not limited thereto.

First, AP 1 may transmit the RTS frame. It is assumed that RA for use in the RTS frame is set to STA 1. STA 1 may transmit the CTS frame to AP 1. TA of the CTS frame may be set to AP 1.

STA 3 may receive the CTS frame from STA 1, and may confirm that the received frame is not identical to its own intended frame. Accordingly, STA 3 may set the NAV based on the CTS frame (S2801).

Meanwhile, the AP 2 that has not received the RTS and CTS frame exchanged between the AP 1 and the STA 1 may transmit the MU-RTS frame.

It is assumed that the MU-RTS frame is not used for STA 3, and is used for other multiple STAs. In addition, it is assumed that the duration indicated by the MU-RTS frame is higher than the current NAV of the STA 3. Therefore, STA 3 may update the NAV using the MU-RTS frame (S2802).

In addition, AP 2 may not receive the CTS frame from multiple STAs after transmission of the MU-RTS frame, such that it is assumed that the AP does not transmit data any longer.

STA 3 does not receive the CTS frame of another STA or the data frame of the AP within the predetermined time from the MU-RTS reception time, such that the STA 3 may reset the NAV (S2803).

After the NAV is reset, the STA 3 may perform channel access. The frame transmitted by STA 3 may collide with the frame transmitted from the AP 1 to the STA 1. The above-mentioned problem may more frequently occur in the concentrated environment (e.g., the case in which many OBSSs exist in the peripheral region).

Figure 29:
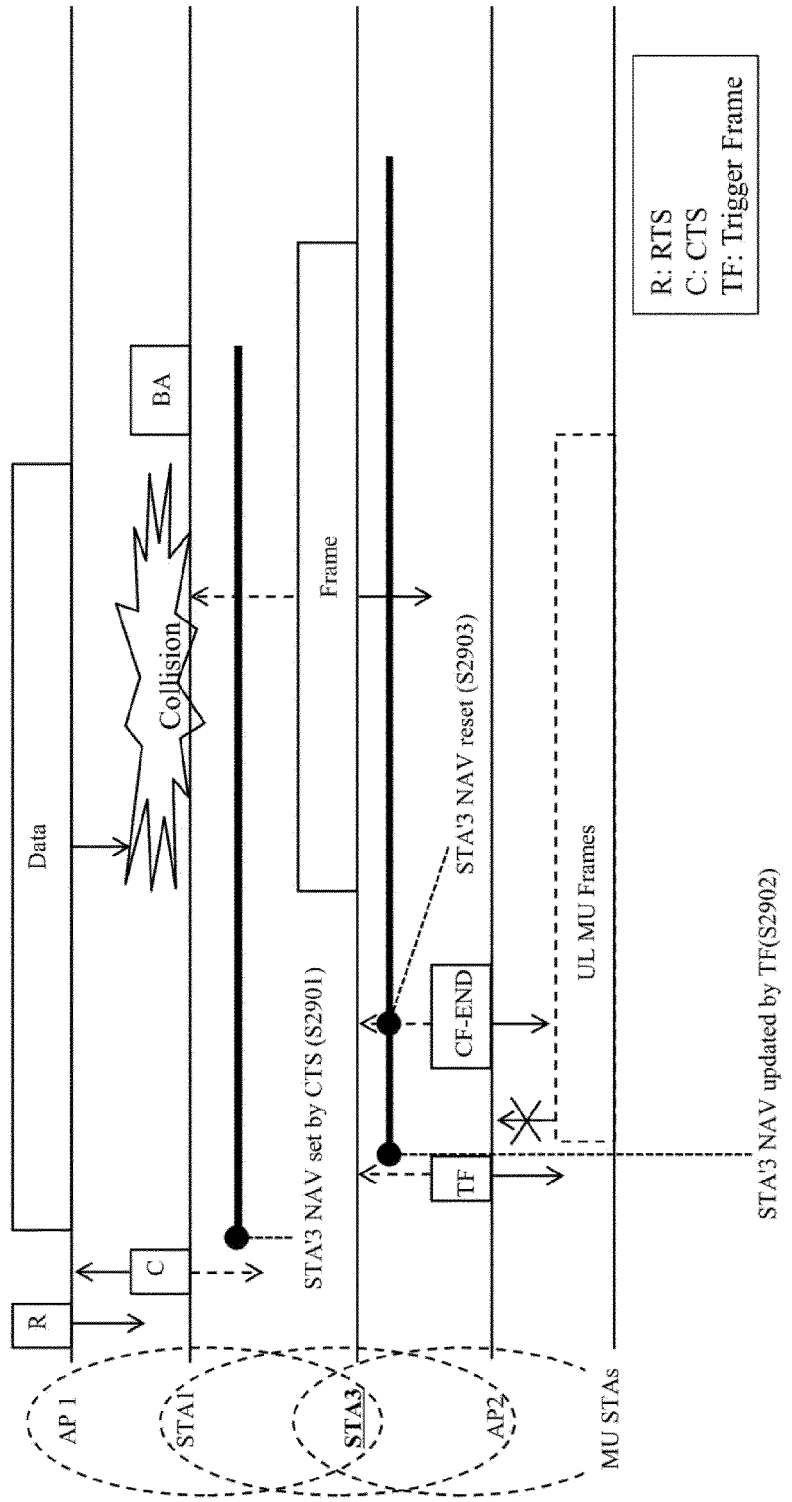
FIG. 29 is a conceptual diagram illustrating an example of frame collision caused by NAV reset according to another embodiment of the present invention.

FIG. 29 is a conceptual diagram illustrating an example of frame collision caused by NAV reset according to another embodiment of the present invention. The same description as in FIG. 28 will herein be omitted. STA 3 may assume that the STA 1 has set the NAV through the CTS frame in the same manner as in FIG. 28.

AP 2 has transmitted the trigger frame for triggering UL MU frame transmission of different multiple STAs instead of the STA 3.

It is assumed that the duration indicated by the trigger frame is higher than the current NAV value. Therefore, STA 3 may update the NAV based on the trigger frame (S2902).

In addition, AP 2 has not received the UL MU frame from multiple STAs after transmission of the trigger frame, and thus it is assumed that the AP has transmitted the CF-END frame.

STA 3 may reset the NAV after receiving the CF-END frame (S2903).

After completion of the NAV resetting, the STA 3 may perform channel access, there is a problem in which the frame transmitted by the STA 3 unavoidably collides with the frame transmitted to the STA 1 in the same manner as in FIG. 28.

In order to solve the frame collision problem caused by NAV resetting as shown in FIG. 28 and/or FIG. 29, the following methods (1) to (3) may be considered, without being limited thereto.

(1) NAV Update Using Previous NAV Timer Value

In accordance with one embodiment, the STA may maintain two NAV timer values. For example, STA 3 may maintain the current NAV timer and the previous NAV timer. If the STA does not receive any frame or receives the CF-END frame during a predetermined time starting from the MU-RTS frame reception time, the STA may perform NAV update using the previous NAV timer value. For example, the predetermined time may be denoted by "(2*aSIFSTime)+(CTS_Time)+aRxPHYStartDelay+(2*aSlotTime)", without being limited thereto.

Meanwhile, in case of using the 11ad, although the DMG-STA sets the NAV timer for each RA/TA, the above-mentioned scheme has disadvantage in that there is high complexity in NAV management.

Figure 30:
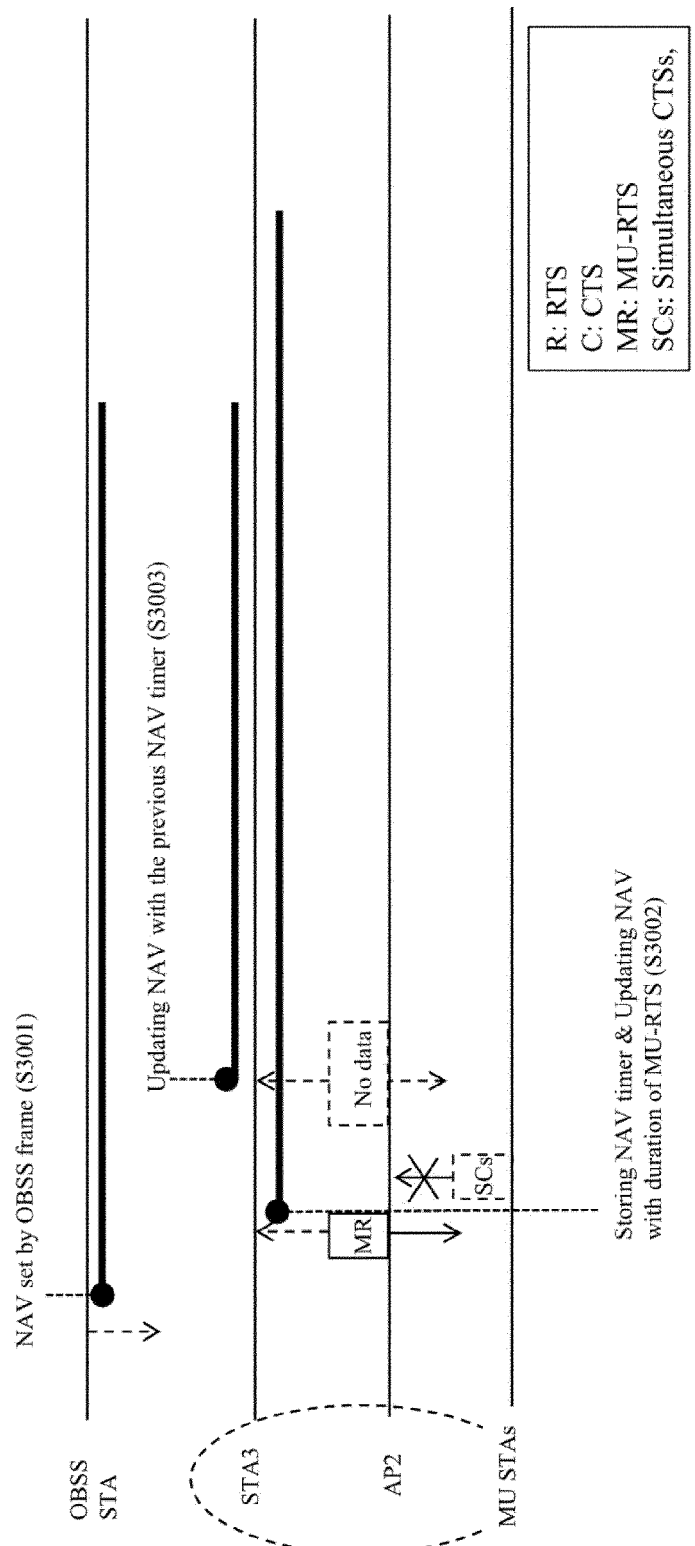
FIG. 30 is a conceptual diagram illustrating a method for updating the NAV using a previous NAV timer value according to an embodiment of the present invention.

FIG. 30 is a conceptual diagram illustrating a method for updating the NAV using a previous NAV timer value according to an embodiment of the present invention.

Referring to FIG. 30, STA3 may set the NAV through the OBSS frame having been transmitted by the OBSS STA (S3001). For example, the OBSS frame may be a CTS frame, without being limited thereto.

Thereafter, STA3 may receive the MU-RTS frame having been transmitted from the AP 2. It is assumed that the STA3 is not set to RA of the MU-RTS frame and the duration indicated by the MU-RTS frame is higher than the current NAV of the STA 3.

Therefore, it is necessary for the STA 3 to update the NAV based on the MU-RTS frame. In this case, STA3 may first store the current NAV value, and may then update the NAV based on the MU-RTS frame (S3002).

It is assumed that multiple STAs corresponding to the RA of the MU-RTS have not transmitted the CTS frame and the AP2 has not transmitted the data frame.

Since the STA3 has not received the CTS frame or the data frame within a predetermined time from the MU-RTS frame reception time, the NAV needs to be reset. In this case, STA3 may confirm the previous NAV value pre-stored before the NAV resetting. If the previous NAV value is not identical to zero '0', STA3 may update the NAV to the previous NAV value instead of resetting the NAV (S3003). For example, STA3 may restore the previous NAV value, and the channel access is not performed during a predetermined time in which the restored NAV is valid. Therefore, TXOP of the OBSS STA may be protected.

(2) NAV Update Using NAV Difference Value

In accordance with one embodiment, the NAV update may be performed using the NAV difference value. For example, STA may calculate and store the NAV difference value whenever the NAV is updated. The NAV difference value may be represented by [NAV value to be updated by the duration indicated by the received frame—the STA's current value obtained prior to NAV updating].

If the STA does not receive any frame within the predetermined time from the MU-RTS frame reception time, or if the STA receives the CF-END frame, STA may update the NAV update using the NAV difference value. For example, STA may update the NAV to [Current NAV value–NAV difference value].

Meanwhile, when [Current NAV value–NAV difference value] is equal to or less than zero '0', NAV may be set to zero '0' (e.g., NAV reset).

Figure 31:
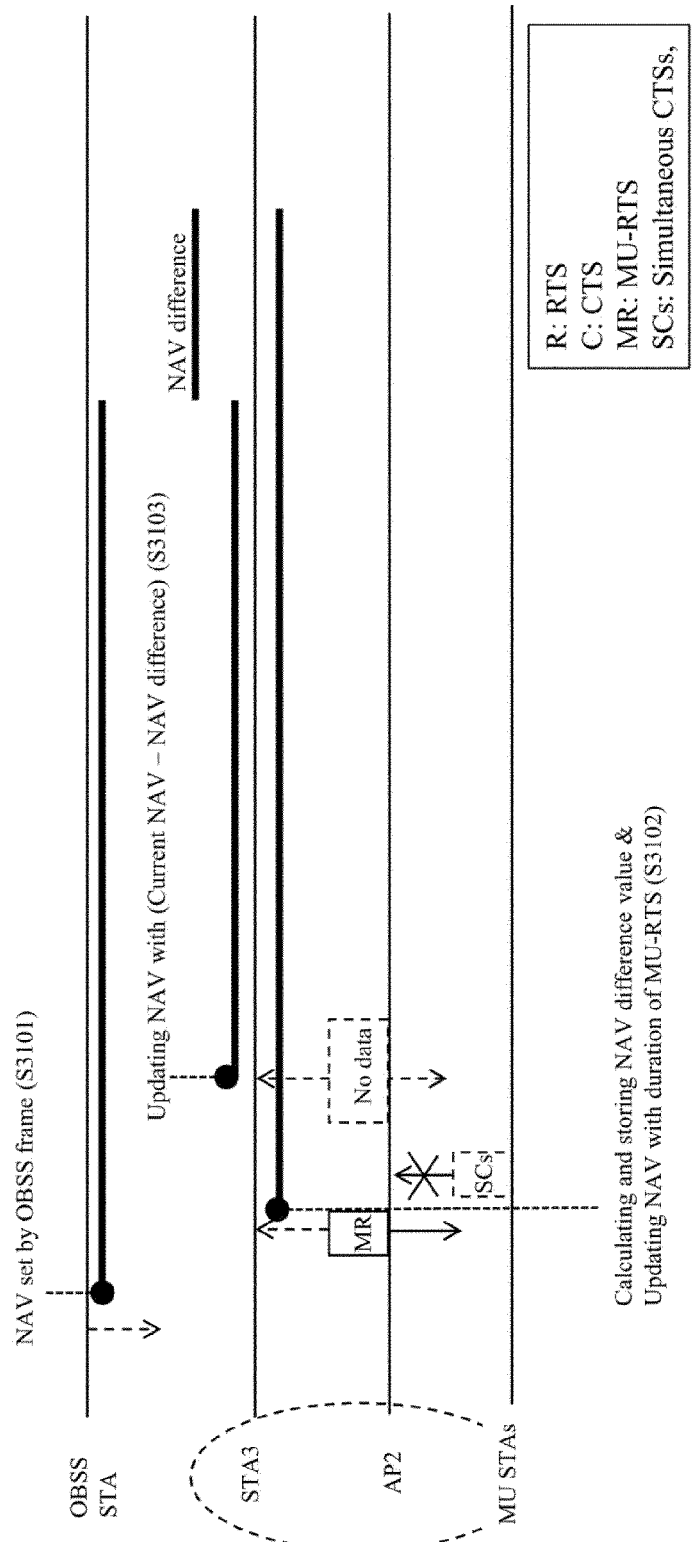
FIG. 31 is a conceptual diagram illustrating a method for updating the NAV using a NAV difference value according to an embodiment of the present invention.

FIG. 31 is a conceptual diagram illustrating a method for updating the NAV using the NAV difference value according to an embodiment of the present invention.

Referring to FIG. 31, STA3 may set the NAV through the OBSS frame having been transmitted from the OBSS STA (S3101). For example, the OBSS frame may be a CTS frame, without being limited thereto.

Thereafter, STA3 may receive the MU-RTS frame having been transmitted from the AP 2. It is assumed that ID information indicating the STA3 is not contained in the MU-RTS frame, and the duration indicated by the MU-RTS frame is higher than the current NAV of the STA 3.

Therefore, there is a need for STA3 to update the NAV based on the MU-RTS frame. In this case, the STA 3 may calculate and store the NAV difference value, and may then perform NAV update based on the MU-RTS frame (S3102).

It is assumed that multiple STAs corresponding to AIDs indicated by the MU-RTS have not transmitted the CTS frame, and the AP2 has not transmitted the data frame to STAs.

STA3 has not received the CTS frame or the data frame within the predetermined time from the MU-RTS frame reception time, such that the NAV needs to be reset. In this case, STA3 may calculate [Current NAV–NAV difference value] prior to NAV resetting.

If [Current NAV–NAV difference value] is higher than zero '0', STA3 may update the NAV to [Current NAV–NAV difference value] instead of resetting the NAV (S1003). In a similar way to FIG. 30, the STA3 may restore the previous NAV value, and the channel access may not be performed during the predetermined time in which the restored NAV is valid. Therefore, TXOP of the OBSS STA may be protected.

(3) NAV Update Indicator

In accordance with one embodiment, when the STA does not receive any frame within the predetermined time from the MU-RTS frame reception time, or when the STA receives the CF-END frame, if the previous NAV value is set to zero '0', the STA may reset the NAV. For example, if the current NAV value is an initial setting from NAV=0, STA may reset the NAV.

STA may maintain the NAV update indicator that indicates whether the current NAV value is an initial setting from NAV=0 or is updated from NAV≠0.

Figure 32:
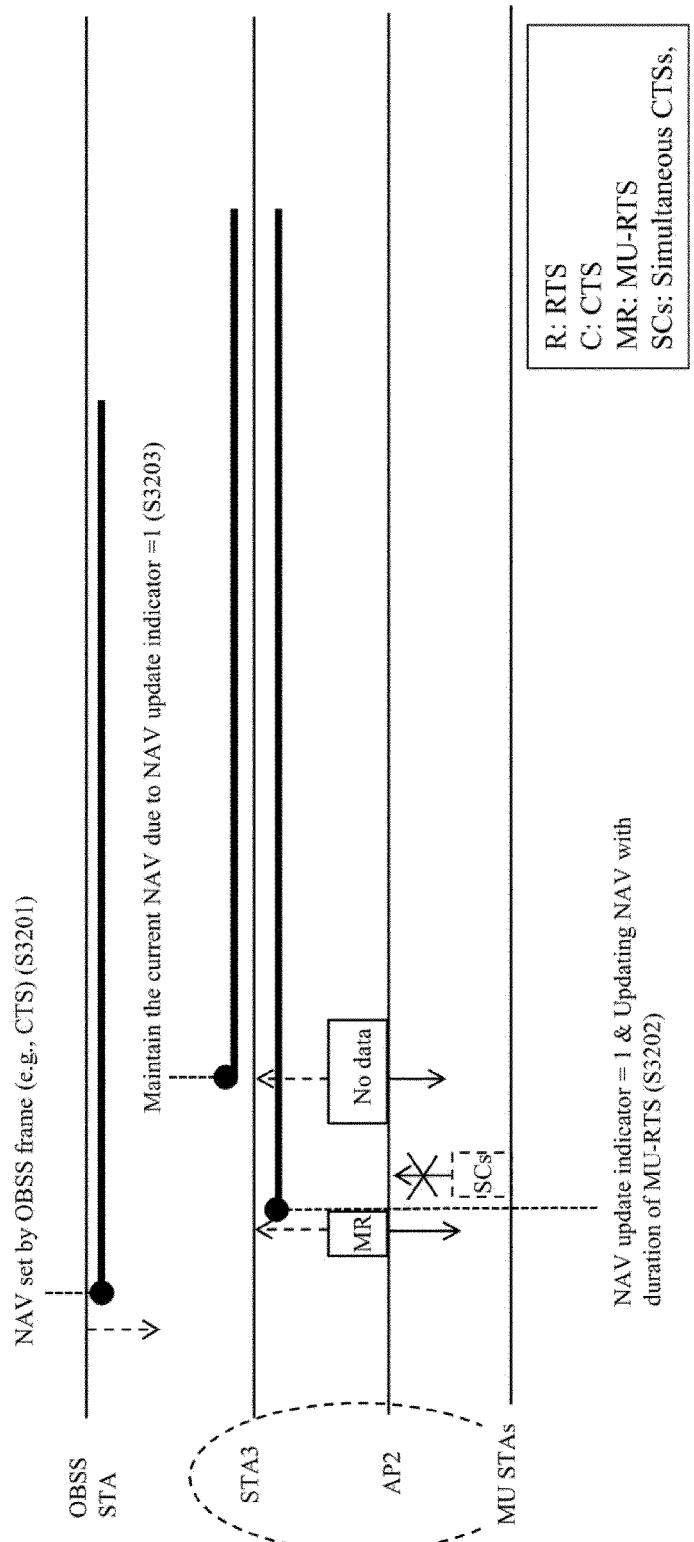
FIG. 32 is a conceptual diagram illustrating a method for managing the NAV using an NAV update indicator according to an embodiment of the present invention.

FIG. 32 is a conceptual diagram illustrating a method for managing the NAV using the NAV update indicator according to an embodiment of the present invention.

Referring to FIG. 32, STA3 may establish the NAV through the OBSS frame having been transmitted from the OBSS STA (S3201). For example, the OBSS frame may be identical to the CTS frame, without being limited thereto. If it is assumed that the NAV setting is an initial setting, the NAV update indicator may be set to zero '0'.

Thereafter, STA3 may receive the MU-RTS frame from the AP 2. It is assumed that STA3 is not contained in the AID information list of STAs indicated by the MU-RTS frame or is not contained in the address information list indicating the Receiver STA, and the duration indicated by the MU-RTS frame is higher than the current NAV of the STA3.

Therefore, STA3 may update the NAV based on the MU-RTS frame. In this case, since the NAV value an initial setting by the OBSS frame is valid for STA 3 (i.e., NAV≠0), the NAV update indicator may be set to '1' when the NAV is updated based on the MU-RTS frame (S3202).

It is assumed that multiple STAs corresponding to the RA of the MU-RTS have not transmitted the CTS frame and the AP2 has not transmitted the data frame.

STA3 does not receive the CTS frame or the data frame within the predetermined time from the MU-RTS frame reception time, such that the NAV needs to be reset. In this case, STA3 may confirm the NAV update indicator prior to NAV resetting.

Since the NAV update indicator is set to '1', the STA3 may maintain the current NAV without resetting the NAV. Therefore, TXOP of the OBSS STA may be protected.

Figure 33:
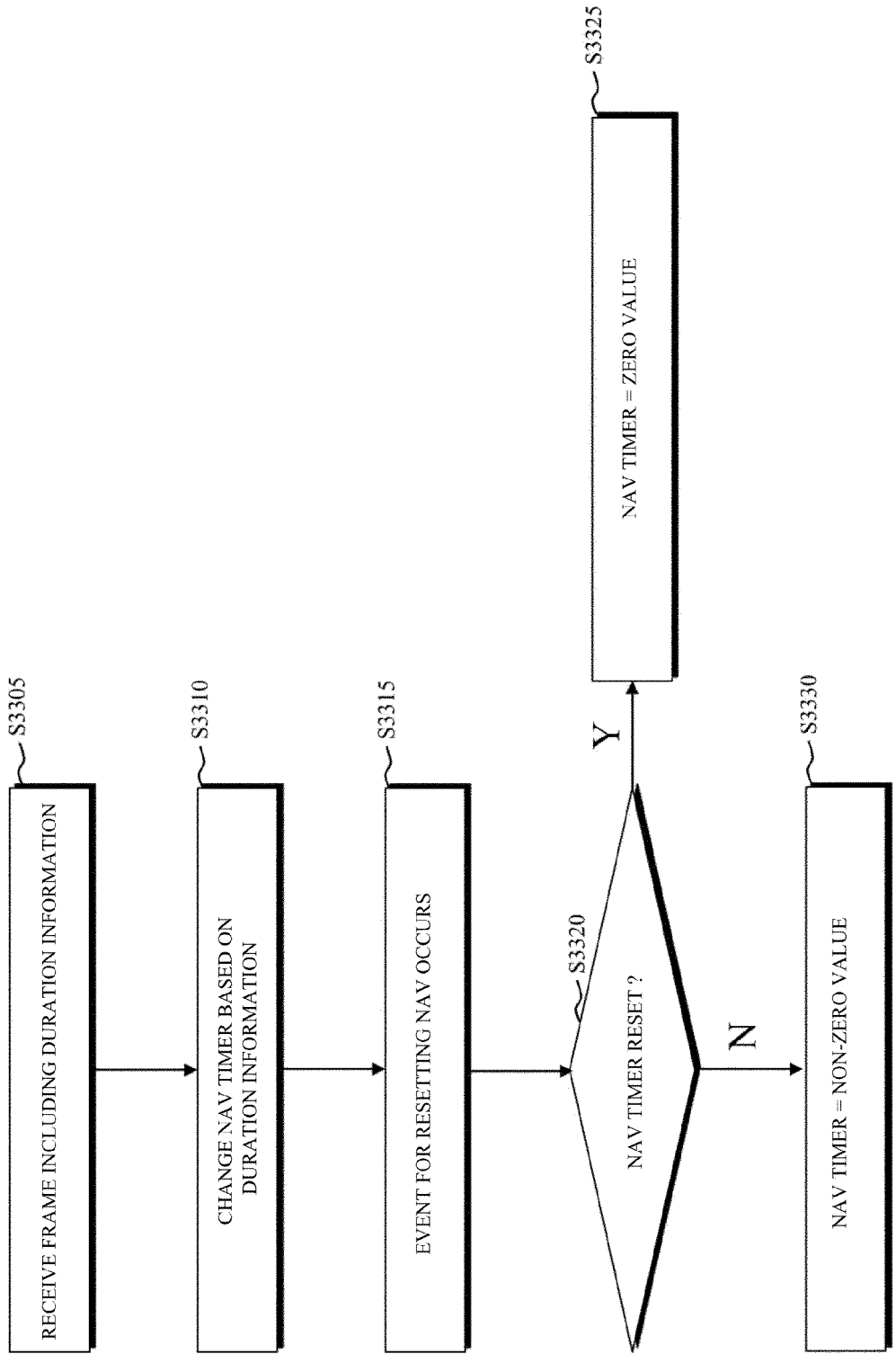
FIG. 33 is a flowchart illustrating a method for managing the NAV according to an embodiment of the present invention.

FIG. 33 is a flowchart illustrating a method for managing the NAV according to an embodiment of the present invention. The same content as in the above description will herein be omitted.

Referring to FIG. 33, the STA may receive the frame including the duration information (S3305). The duration information may be indicated through the duration field contained in the MAC header (e.g., header of MPDU) of the frame, or may be indicated through the TXOP field contained in the HE-SIG A field, without being limited thereto.

For convenience of description, it is assumed that the STA is not set to the RA (or TA) of the corresponding frame. For example, it is assumed that the STA is identical to a third party STA instead of the TXOP holder/responder.

STA may change the NAV timer based on the duration information of the received frame (S3310). For example, the STA may change the first NAV value to the second NAV value. The first NAV value may be a residual time that was present in the NAV timer immediately before the STA changes the NAV timer, and the second NAV value may be indicated by the duration information of the received frame. For convenience of description, it is assumed that the second NAV value is higher than the first NAV value. The first NAV value may be a zero value or a non-zero value according to one embodiment. In addition, when the STA is able to decode the MAC header of the frame, the STA may obtain the second NAV value through the duration field of the MAC header. When the STA is unable to decode the MAC header of the frame, the STA may obtain the second NAV value through the TXOP field of HE-SIG A, without being limited thereto.

After the NAV timer is changed, an event for the NAV resetting may occur (S3315).

For example, the frame (S3305) having been received by the STA may be RTS (request to send) or MU-RTS (multi user-RTS), and the event for resetting the NAV timer may include no reception of another frame (e.g., CTS/eCTS, Data frame, or the like) within a predetermined time from the RTS/MU-RTS reception time. For example, the predetermined time may be denoted by [(2*aSIFSTime)+(CTS_Time)+aRxPHYStartDelay+(2*aSlotTime)], without being limited thereto.

In addition, the frame (S3305) received by the STA may be a trigger frame, and the event for resetting the NAV timer may also include reception of the CF (contention free)-END frame.

In step S3320, STA may determine whether or not to reset the NAV timer in consideration of the residual time (e.g., the first NAV value) present in the NAV timer immediately before the NAV timer is changed (S3310).

If determined to reset the NAV timer, the NAV timer may be set to zero '0' (S3325).

If determined not to reset the NAV timer, the NAV timer is set to the non-zero value (S3335). The non-zero value may correspond to a current NAV timer value as it is, or may correspond to change to another value.

For example, STA may store the NAV update indicator that indicates whether the change (S3310) of the NAV timer is an initial setting from the zero value or is an update from the non-zero value. If the stored NAV update indicator indicates the initial setting from the zero value, the STA may reset the NAV timer. In contrast, when the stored NAV update indicator indicates the update from the non-zero value, the STA may maintain the NAV timer without resetting the NAV timer.

In another example, in changing the NAV timer (S3310), the STA may store the NAV difference value indicating a difference between the NAV timer value (e.g., the second NAV value changed based on the duration information and the residual time (e.g., the first NAV value) present in the NAV timer immediately before the NAV timer is changed. If the event for resetting the NAV timer occurs, STA may restore, using the stored NAV difference value, a time that would be present in the NAV timer at a current time if the NAV timer were not changed by the frame. In more detail, STA may change the NAV timer to the expression denoted by [Current NAV value−NAV difference value]

In another example, in changing the NAV timer (S3310), the STA may additionally store and manage the previous NAV timer immediately before the NAV timer is changed. For example, when the event for resetting the NAV timer occurs, the STA may determine whether or not the previous NAV timer is valid. If the previous NAV timer is valid, the STA changes the NAV timer of a current time to the previous NAV timer without resetting the NAV timer. In addition, in determining whether the previous NAV timer is valid, if the previous NAV timer is higher than zero '0', the STA may determine that the previous NAV timer is valid. If the previous NAV timer is set to zero '0', the STA may determine that the previous NAV timer is invalid.

Figure 34:
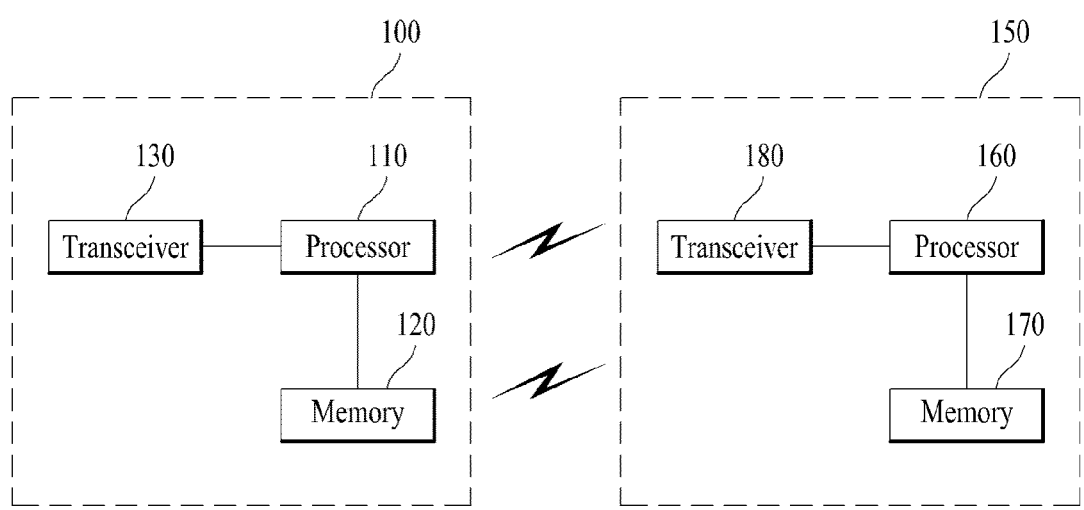
FIG. 34 is a block diagram illustrating an apparatus according to an embodiment of the present invention.

FIG. 34 illustrates devices for implementing the aforementioned methods.

A wireless device 100 and a wireless device 150 in FIG. 34 may correspond to the aforementioned specific STA and AP, respectively.

The STA 100 may include a processor 110, a memory 120, and a transceiver 130 and the AP 150 may include a processor 160, a memory 170, and a transceiver 160. The transceivers 130 and 180 may transmit/receive a wireless signal and may be implemented in a physical layer of IEEE 802.11/3GPP. The processors 110 and 160 are implemented in a physical layer and/or a MAC layer and are connected to the transceivers 130 and 180. The processors 110 and 160 may perform the above-described UL MU scheduling procedure.

The processors 110 and 160 and/or the transceivers 130 and 180 may include an Application-Specific Integrated Circuit (ASIC), a chipset, a logical circuit, and/or a data processor. The memories 120 and 170 may include a Read-Only Memory (ROM), a Random Access Memory (RAM), a flash memory, a memory card, a storage medium, and/or a storage unit. If an example is performed by software, the above-described method may be executed in the form of a module (e.g., a process or a function) performing the above-described function. The module may be stored in the memories 120 and 170 and executed by the processors 110 and 160. The memories 120 and 170 may be located at the interior or exterior of the processors 110 and 160 and may be connected to the processors 110 and 160 via known means.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The present invention has been described on the assumption that the present invention is applied to a wireless LAN system supporting HE PPDUs. However, the present invention is not limited thereto and can be applied to various wireless communication systems including IEEE 802.11.

The invention claimed is:

1. A method for managing a network allocation vector (NAV) by a station (STA) in a wireless local area network (WLAN) system, the method comprising:
 configuring a NAV timer for a specific STA based on duration information of a first frame;
 receiving a second frame including duration information;
 wherein the duration information is an information for TXOP (Transmission Opportunity) of the second frame,
 updating the NAV timer for the specific STA based on the duration information of the second frame when a value of the duration information of the second frame is greater than a value of the NAV timer just before updating the NAV timer;

calculating a first difference value between a value of the NAV timer to be updated based on the value of the duration information of the second frame and the value of the NAV timer just before updating the NAV timer, determining whether to reset the NAV timer, based on the first difference value, when an event for resetting the NAV timer related to the second frame occurs, and wherein when a second difference value between a value of the NAV timer at occurring of the event for resetting the NAV timer and the first difference value is greater than 0, updating the NAV timer based on the second difference without resetting the NAV timer configured based on the duration information of the first frame, wherein when the second difference value is equal to or less than 0, resetting the NAV timer.

2. The method according to claim 1, wherein in updating the NAV timer for the specific STA based on the duration information of the second frame, the STA stores a NAV update indicator which indicates whether the update of the NAV timer is an initial setting from a zero value or is an update from a non-zero value.

3. The method according to claim 2, wherein when the stored NAV update indicator indicates that the update of the NAV timer is the initial setting from the zero value, the STA resets the NAV timer.

4. The method according to claim 2, wherein when the stored NAV update indicator indicates that the update of the NAV timer is the update from the non-zero value, the STA maintains the NAV timer without resetting the NAV timer.

5. The method according to claim 1, wherein in updating the NAV timer for the specific STA based on the duration information of the second frame, the STA stores the first difference value.

6. The method according to claim 1, wherein the second frame is Request-to-Send (RTS) or Multi User-RTS (MU-RTS); and wherein the event for resetting the NAV timer includes no reception of another frame within a predetermined time from a reception time of the second frame.

7. The method according to claim 1, wherein the second frame is a trigger frame; and wherein the event for resetting the NAV timer includes a reception of a Content Free (CF) END frame.

8. A station (STA) for managing a network allocation vector (NAV) in a wireless local area network (WLAN) system, the STA comprising:

a receiver to receive a first frame and a second frame each including duration information; and a processor to:

configure a NAV timer for a specific STA based on the duration information of the first frame;

wherein the duration information is an information for TXOP (Transmission Opportunity) of the second frame, update the NAV timer for the specific STA based on the duration information of the second frame when a value of the duration information of the second frame is greater than a value of the NAV timer just before updating the NAV timer;

calculate a first difference value between a value of the NAV timer to be updated based on the value of the duration information of the second frame and the value of the NAV timer just before updating the NAV timer, determine whether to reset the NAV timer based on the first difference value, when an event for resetting the NAV timer occurs related to the second frame, and wherein when a second difference value between a value of the NAV timer at occurring of the event for resetting the NAV timer and the first difference value is greater than 0, updating the NAV timer based on the second difference without resetting the NAV timer configured based on the duration information of the first frame, wherein when the second difference value is equal to or less than 0, resetting the NAV timer.

9. The STA according to claim 8, wherein in updating the NAV timer for the specific STA based on the duration information of the second frame, the processor stores a NAV update indicator which indicates whether the update of the NAV timer is an initial setting from a zero value or is an update from a non-zero value.

10. The STA according to claim 9, wherein when the stored NAV update indicator indicates that the update of the NAV timer is the initial setting from the zero value, the processor resets the NAV timer.

11. The STA according to claim 9, wherein when the stored NAV update indicator indicates that the update of the NAV timer is the update from the non-zero value, the processor maintains the NAV timer without resetting the NAV timer.

12. The STA according to claim 8, wherein in updating the NAV timer for the specific STA based on the duration information of the second frame, the processor stores the first difference value.

13. The STA according to claim 8, wherein when the second frame is Request-to-Send (RTS) or Multi User-RTS (MU-RTS), the event for resetting the NAV timer includes no reception of another frame within a predetermined time from a reception time of the second frame, and wherein when the second frame is a trigger frame, the event for resetting the NAV timer includes a reception of a Content Free (CF) END frame.

* * * * *